us012357914B2

United States Patent
Benedetto et al.

(10) Patent No.: US 12,357,914 B2
(45) Date of Patent: Jul. 15, 2025

(54) METHODS AND SYSTEMS FOR ARTIFICIAL INTELLIGENCE (AI)-BASED STORYBOARD GENERATION

(71) Applicant: Sony Interactive Entertainment Inc., Tokyo (JP)

(72) Inventors: Warren M. Benedetto, Foothill Ranch, CA (US); Jonathan Webb, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 228 days.

(21) Appl. No.: 18/179,032

(22) Filed: Mar. 6, 2023

(65) Prior Publication Data

US 2024/0299851 A1 Sep. 12, 2024

(51) Int. Cl.
*A63F 13/60* (2014.01)
*A63F 13/47* (2014.01)
*A63F 13/49* (2014.01)

(52) U.S. Cl.
CPC .............. *A63F 13/60* (2014.09); *A63F 13/47* (2014.09); *A63F 13/49* (2014.09); *A63F 2300/632* (2013.01)

(58) Field of Classification Search
CPC ................ A63F 13/44–50; A63F 13/52; A63F 13/55–57; A63F 13/60; A63F 13/67;
(Continued)

(56) References Cited

U.S. PATENT DOCUMENTS 9,106,812 B1 * 8/2015 Price .................... G06F 16/40
11,375,256 B1 * 6/2022 Dorner .................. G06N 3/04
(Continued)

FOREIGN PATENT DOCUMENTS

CN 111243060 A 6/2020
CN 114610893 A 6/2022
(Continued)

OTHER PUBLICATIONS

Xu, Xingqian et al., "Versatile Diffusion: Text, Images and Variations All in One Diffusion Model," arXiv:2211.08332v1, Nov. 15, 2022, 12 pages.
(Continued)

*Primary Examiner* — Omkar A Deodhar
(74) *Attorney, Agent, or Firm* — Kilpatrick Townsend & Stockton LLP

(57) ABSTRACT

An initial seed input for generation of a storyboard is received. A current image generation input is set the same as the initial seed input. A first artificial intelligence model is executed to automatically generate a current frame image based on the current image generation input. The current frame image and its corresponding description are stored as a next frame in the storyboard. A second artificial intelligence model is executed to automatically generate a description of the current frame image. A third artificial intelligence model is executed to automatically generate a next frame input description for the storyboard based on the description of the current frame image. The current image generation input is set the same as the next frame input description. Then, execution of the first, second, and third artificial intelligence models is repeated until a final frame image and its corresponding description are generated and stored.

20 Claims, 12 Drawing Sheets

(58) Field of Classification Search
CPC ...... A63F 13/69; A63F 13/7077; A63F 13/79; A63F 2300/632
See application file for complete search history.

(56) References Cited

U.S. PATENT DOCUMENTS

| | | | |
|---|---|---|---|
| 2018/0356967 A1* | 12/2018 | Rasheed | G06F 40/253 |
| 2020/0311341 A1 | 10/2020 | Chaturvedi et al. | |
| 2021/0304468 A1* | 9/2021 | Doggett | G11B 27/031 |
| 2022/0237368 A1* | 7/2022 | Tran | G06N 20/00 |
| 2023/0252224 A1* | 8/2023 | Tran | G06F 40/56 |
| | | | 715/256 |
| 2024/0353979 A1* | 10/2024 | Han | G06F 16/74 |

FOREIGN PATENT DOCUMENTS

| | | |
|---|---|---|
| TW | 202123188 A | 6/2021 |
| WO | 2021076381 A1 | 4/2021 |

OTHER PUBLICATIONS

Anonymous: "Broken Picture Telephone—Wikipedia," Jan. 28, 2023, 4 pages.
PCT/US2024/016957, International Search Report and Written Opinion, Mailed Jun. 13, 2024, 11 pages.

\* cited by examiner

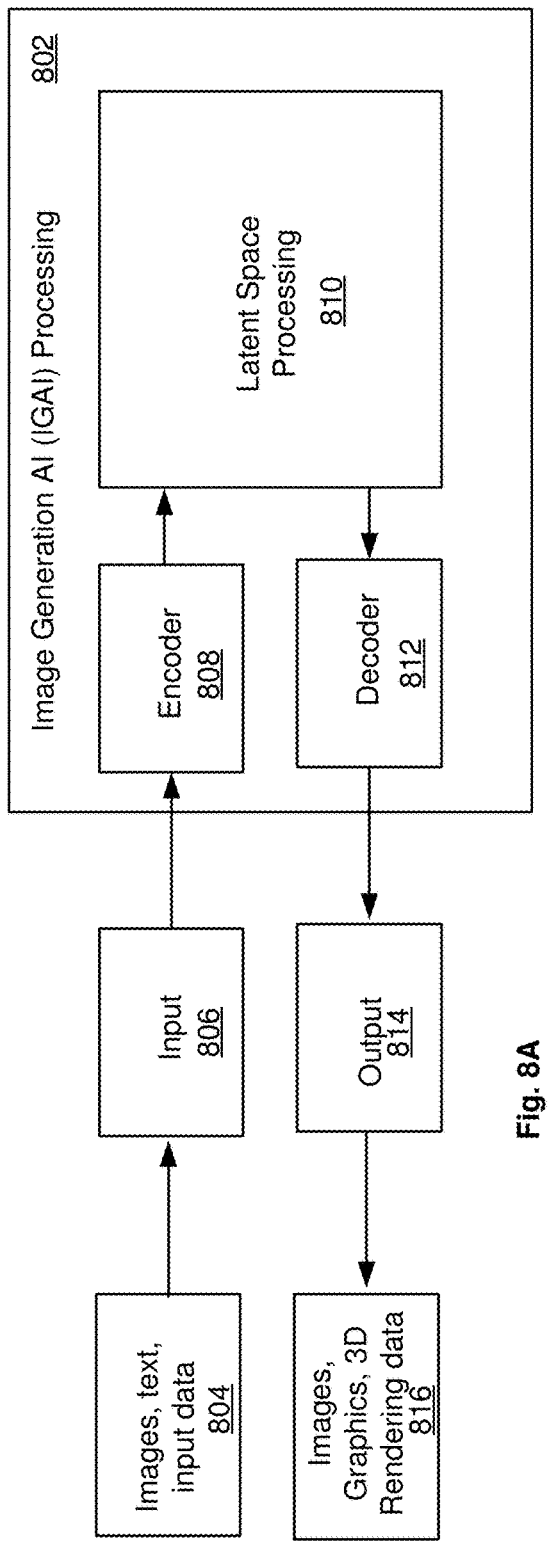
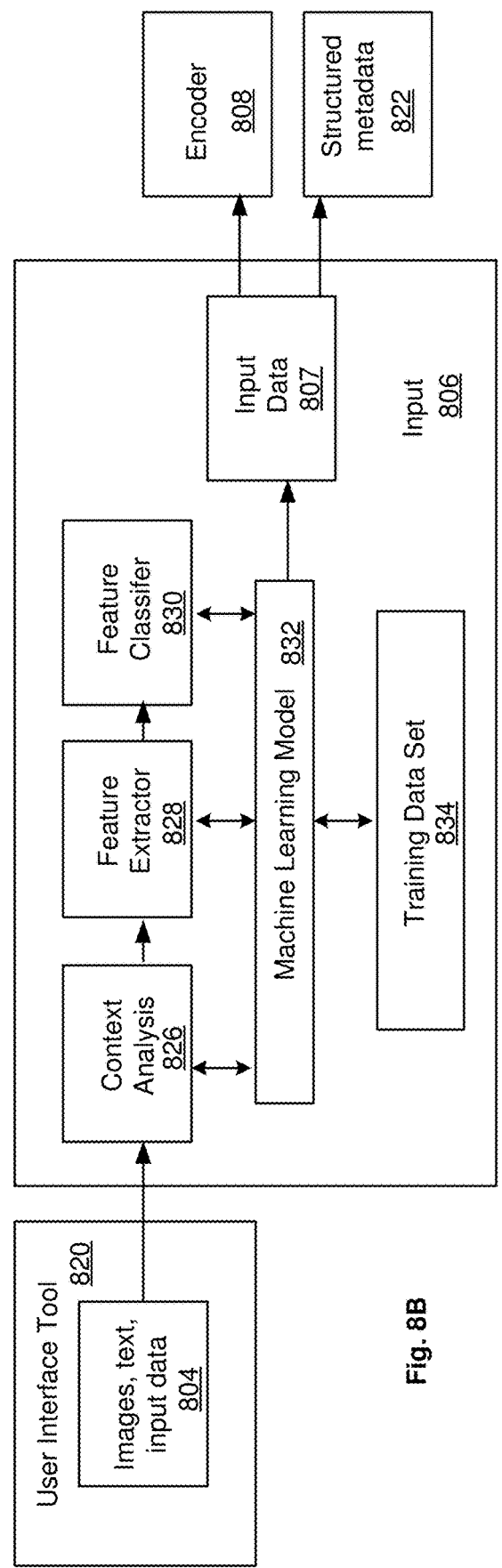
Fig. 8A
Fig. 8B

METHODS AND SYSTEMS FOR ARTIFICIAL INTELLIGENCE (AI)-BASED STORYBOARD GENERATION

BACKGROUND OF THE INVENTION

The video game industry has seen many changes over the years and has been trying to find ways to enhance the video game play experience for players and increase player engagement with the video games and/or online gaming systems. When a player increases their engagement with a video game, the player is more likely to continue playing the video game and/or play the video game more frequently, which ultimately leads to increased revenue for the video game developers and providers and video game industry in general. Over time, the content of some video games may become stale for some players. Therefore, video game developers and providers continue to seek improvements in video game operations to provide for increased richness and diversity of video game content in the interests of promoting player engagement and enhancing player experience. It is within this context that embodiments of the present disclosure arise.

SUMMARY OF THE INVENTION

In an example embodiment, a method is disclosed for artificial intelligence-based storyboard generation. The method includes receiving an initial seed input for generation of a storyboard. The method also includes setting a current image generation input the same as the initial seed input. The method also includes executing a first artificial intelligence model to automatically generate a current frame image based on the current image generation input. The method also includes storing the current frame image as a next frame in the storyboard. The method also includes storing the current image generation input as a description of the next frame in the storyboard when the current image generation input is in either a textual format or an audio format. The method also includes executing a second artificial intelligence model to automatically generate a description of the current frame image. The method also includes executing a third artificial intelligence model to automatically generate a next frame input description for the storyboard based on the description of the current frame image. The method also includes setting the current image generation input the same as the next frame input description. The method also includes repeating the execution of the first artificial intelligence model, storing the current frame image and its corresponding description, execution of the second artificial intelligence model, executing the third artificial intelligence model, and setting the current image generation input as the next frame input description until a final frame image and its corresponding description are generated and stored.

In an example embodiment, a system for artificial intelligence-based storyboard generation is disclosed. The system includes an input processor configured to receive an initial seed input for generation of a storyboard. The system also includes a first artificial intelligence model that is configured to automatically generate an image for the storyboard based on an input specification. The system also includes a second artificial intelligence model that is configured to automatically generate a description of the image generated by the first artificial intelligence model. The system also includes a third artificial intelligence model that is configured to automatically generate a next frame input description for the storyboard based on the description of the image generated by the second artificial intelligence model. The system also includes a controller that is configured to initiate generation of the storyboard by providing the initial seed input as the input specification to the first artificial intelligence model for generation of a first frame of the storyboard. The controller is also configured to direct successive execution of the first, second, and third artificial intelligence models for respective generation of successive frames of the storyboard, with the next frame input description for the storyboard as generated by the third artificial intelligence model being provided as the input specification to the first artificial intelligence model. The system also includes an output processor that is configured to store each image generated by the first artificial intelligence model and its corresponding input specification as a respective frame of the storyboard.

BRIEF DESCRIPTION OF THE DRAWINGS

FIG. 8A is a general representation of an image generation AI (IGAI) processing sequence, in accordance with some embodiments.

FIG. 8B illustrates additional processing that may be done to the input, in accordance with some embodiments.

DETAILED DESCRIPTION OF THE INVENTION

Figure 1A:
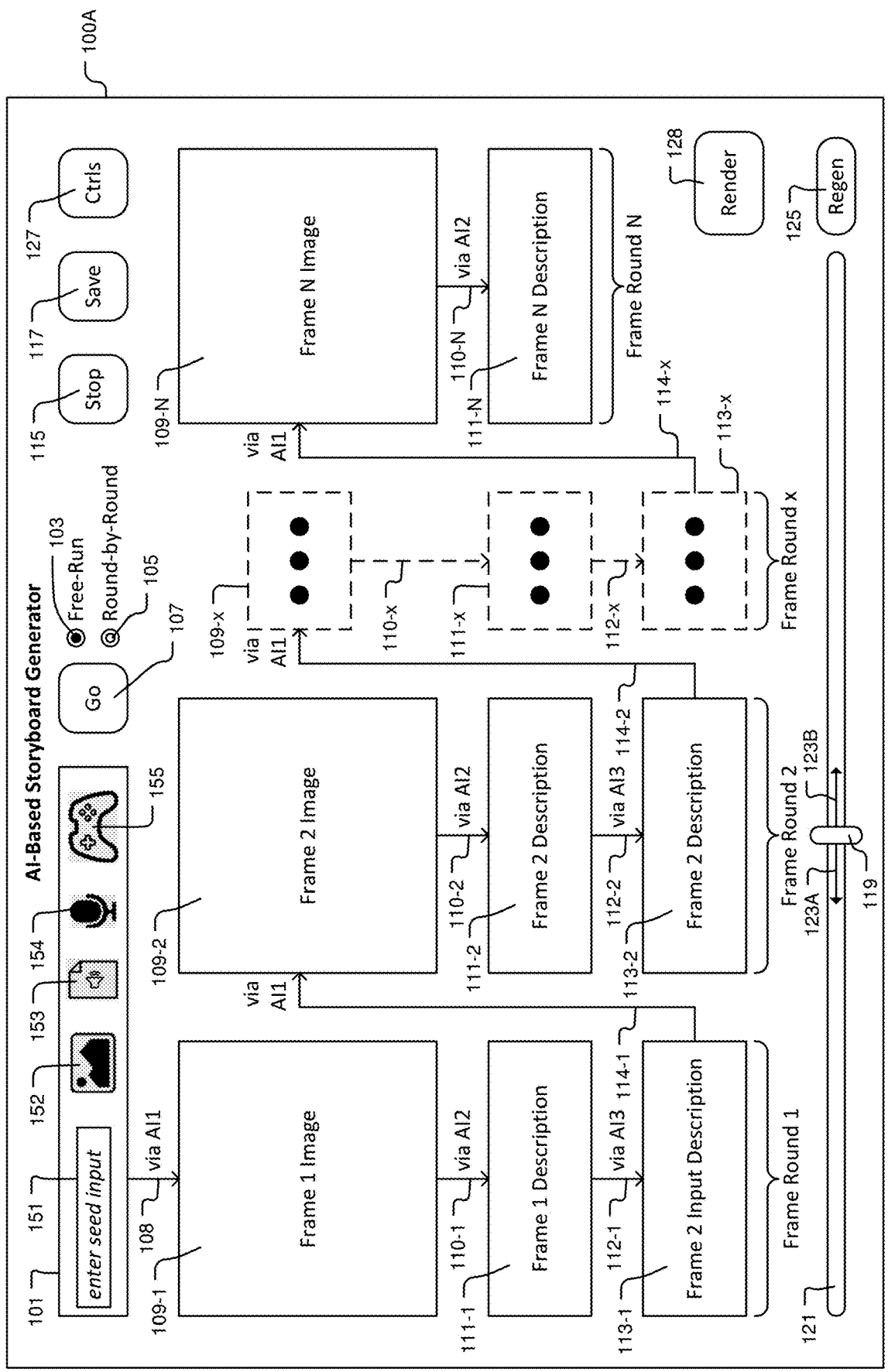
FIG. 1A shows a user interface for an AI-based storyboard generator set to operate in a free-run mode, in accordance with some embodiments.

In the following description, numerous specific details are set forth in order to provide a thorough understanding of the present disclosure. It will be apparent, however, to one skilled in the art that embodiments of the present disclosure may be practiced without some or all of these specific details. In other instances, well known process operations have not been described in detail in order not to unnecessarily obscure the present disclosure.

Method and systems are disclosed herein for automatic artificial intelligence (AI)-based generation of a storyboard based on an initial seed input. In various embodiments, the initial seed input can be provided by user, by a video game, or by another computer program. The initial seed input is some form of descriptive content that can be used as the basis for AI-based generation of an initial frame image of the storyboard. In various embodiments, the initial seed input is one or more of a textual input, an audio input, an image input, a video game state, a video game scene description, and a video game player action, among others. The initial seed input is provided as input to a first AI model that automatically generates an image based on the initial seed input. The image generated by the first AI model is submitted as input image to a second AI model that automatically generates a description of what is depicted within the input image. In some embodiments, the description of what is depicted within the input image is a textual description that specifies characteristics, themes, and/or content within the input image. The description of the image as generated by the second AI model is provided as input to a third AI model that automatically generates a description of a next frame to be generated for the storyboard. The description of the next frame to be generated for the storyboard is provided as input to the first AI model for automatic generation of a next frame image of the storyboard. The frame images generated by the first AI model, along with their corresponding descriptions, respectively define the frames of the storyboard. The above-mentioned process of successively executing the first, second, and third AI models is repeated in a circular manner to generate multiple frames of the storyboard until a stop condition is met. In various embodiments, the stop condition is one or more of a maximum number frames to be generated, a maximum runtime of the storyboard generation process, and an interrupt signal received from a user.

In some embodiments, constraints are defined and applied to the AI-based storyboard generation process to assist in steering a direction of the story conveyed by the storyboard and/or to avoid inclusion of unwanted types of content within the storyboard. In various embodiments, the constraints can be applied before starting the AI-based storyboard generation process and/or during the AI-based storyboard generation process as frames of the storyboard are generated. In this manner, constraints can be added by the user when needed during generation of the storyboard, which provides for tuning of the storyboard content and enables mitigation/prevention of storyboard content that could potentially take the story in an undesirable direction. In some embodiments, user-supplied constraints can be specified on a frame-by-frame basis during generation of the storyboard. Also, in some embodiments, a user-supplied input can specify how the storyboard should end. In this manner, the storyboard can be guided to a specified ending, rather than be continuously generated to an abrupt stopping point. In some embodiments, the AI-based storyboard generation process is performed to automatically generate the storyboard from the first frame to the last frame. In some embodiments, the storyboard is automatically analyzed to remove or modify one or more frame images and/or corresponding descriptions within the storyboard.

It should be understood and appreciated that each execution instance of the first AI model, the second AI model, and the third AI model introduces machine-learning-based variability into the AI-based storyboard generation process, such that each run of the AI-based storyboard generation process will result in generation of a different storyboard, regardless of whether the initial seed input is changed or remains the same. Therefore, the AI-based storyboard generation methods and systems disclosed herein provide for automatic generation of dynamically variable storyboard content that can be utilized for many different purposes, including video game development and provision, entertainment, digital content development, website development, computer program development, video creation, book creation, among many other purposes.

In some embodiments, the AI-generated descriptions for the frames of the storyboard are used to provide text for a story represented by the storyboard. In various embodiments, the AI-based storyboard generation process can be used to automatically generate a short book, a novel, a movie, a game, or essentially any other story-conveying product based on seed input information and user-specified constraints. In some embodiments, the AI-based storyboard generation process is moderated by constraints and/or prompts provided by a single user so that the storyboard is generated and steered by a single person. In some embodiments, the AI-based storyboard generation process is moderated by constraints and/or prompts provided by multiple users so that the storyboard is generated and steered by a group of persons.

FIG. 1A shows a user interface 100A for an AI-based storyboard generator set to operate in a free-run mode, in accordance with some embodiments. The user interface 100A includes a seed input control 101 through which a user is able to enter an initial seed input for the AI-based storyboard generation process. In some embodiments, the seed input control 101 includes a text entry field 151 that provides for specification of the initial seed input in a textual format. In some embodiments, the initial seed input is provided in an image format. In some embodiments, an image selection control 152 is provided to enable navigation to and selection of an image file to be used as the initial seed input. In some embodiments, the initial seed input is provided in an audio format. In some embodiments, an audio file selection control 153 is provided to enable navigation to and selection of an audio file to be used as the initial seed input. In some embodiments, a microphone selection control 154 is provided to enable receipt of live audio through a microphone as the initial seed input. In some embodiments, the live audio received through the microphone as the initial seed input is transcribed into text format and is displayed in the text entry field 151.

In some embodiments, a video game connection control 155 is provided to enable connection of the AI-based storyboard generator to a video game. In these embodiments, the video game connection control 155 provides for specification of the initial seed input as one or more of a description of a scene within a video game (e.g., either a static two-dimensional (2D) scene description or a static three-dimensional (3D) scene description or a temporally varying 2D scene description or a temporally varying 3D scene description), a status of a player within the video game, and an action of the player within the video game, or essentially any other descriptive feature associated with execution and play of the video game. In some embodiments, the initial seed input is received directly from the video game. In some embodiments, the initial seed input is received from the video game during live play of the video game by one or more players. In some embodiments, the video game is a cloud-based video game served to one or more client computer systems over the Internet. In some embodiments, the video game is executed locally on a client computer system and/or remotely on a cloud computing system.

The user interface 100A includes a go control 107 and a stop control 115. In some embodiments, once the initial seed input is received by the AI-based storyboard generator through the seed input control 101, the go control 107 is enabled for activation by the user. Activation of the go control 107 directs the AI-based storyboard generator to proceed with automatic generation of the storyboard from a current storyboard state, where the current storyboard state is either an initial startup state or a last saved state upon activation of the stop control 115 by the user. The user interface 100A also includes a save control 117 that upon activation will direct saving of the storyboard as generated by the AI-based storyboard generator.

The AI-based storyboard generator is configured to run in either a free-run mode or a round-by-round mode. The user interface 100A provides for toggled selection of one of a free-run mode selection control 103 and a round-by-round mode selection control 105 at a given time. In the free-run mode, the AI-based storyboard generator runs continuously and automatically through multiple frame generation rounds without pausing for additional user input. In the round-by-round mode, the AI-based storyboard generator runs automatically through a current frame generation round and then pauses for additional user input before proceeding to run through a next frame generation round. In some embodiments, activation of the go control 107 after completion of the current frame generation round directs the AI-based storyboard generator to proceed with the next frame generation round. The example user interface 100A of FIG. 1A is applicable to selection of the free-run mode selection control 103. The example user interfaces 100B and 100C of FIGS. 1B and 1C, respectively, are applicable to selection of the round-by-round mode selection control 105.

When the initial seed input is received through the seed input control 101 and the go control 107 is first activated by the user, the AI-based storyboard generator conveys the initial seed input as input to a first AI model (AI1) and executes the first AI model (AI1) to automatically generate a first frame image 109-1 based on the initial seed input, as indicated by arrow 108. The first frame image 109-1 and the initial seed input are stored together to define a first frame of the storyboard. It should be understood that while the first frame image 109-1 is based on the initial seed input, the first frame image 109-1 includes some content beyond what is specifically characterized by the initial seed input.

After the first frame image 109-1 is generated by the first AI model (AI1), the AI-based storyboard generator conveys the first frame image 109-1 as input to a second AI model (AI2) and executes the second AI model (AI2) to automatically generate a description 111-1 of the first frame image 109-1, as indicated by arrow 110-1. In some embodiments, the second AI model (AI2) is a discriminator type of AI model. In some embodiments, the description 111-1 of the first frame image 109-1 is a natural language description of whatever is depicted in the first frame image 109-1. In some embodiments, the description 111-1 includes information regarding any one or more of objects displayed, persons displayed, colors displayed, lighting displayed, actions conveyed, movements conveyed, situations conveyed, context conveyed, mood conveyed, tone conveyed, emotions conveyed, dangers conveyed, achievements conveyed, concerns conveyed, problems conveyed, humor conveyed, among any other feature or characteristic that can be used to describe the first frame image 109-1. It should be understood that the description 111-1 of the first frame image 109-1 is different (in terms of both what it is and what it contains) than the initial seed input used by the first AI model (AI1) to generate the first frame image 109-1.

After the description 111-1 of the first frame image 109-1 is generated by the second AI model (AI2), the AI-based storyboard generator conveys the description 111-1 of the first frame image 109-1 as input to a third AI model (AI3) and executes the third AI model (AI3) to automatically generate a next frame input description 113-1, as indicated by arrow 112-1. In some embodiments, the next frame input description 113-1 is a textual statement of what happens next in the storyboard based on the description 111-1 of the first frame image 109-1. In some embodiments, the third AI model (AI3) is natural language AI model, such as the Generative Pre-Trained Transformer 3 (GPT-3) AI model by way of example. In some embodiments, the third AI model (AI3) is configured for storytelling, including inferring character motivations. In some embodiments, one or more user-specified weighting factors are applied to respective keywords within the description 111-1 of the first frame image 109-1 to guide the third AI model (AI3) in generation of the next frame input description 113-1. In some embodiments, the third AI model (AI3) is configured to apply emphasis to the keyword(s) within the description 111-1 of the first frame image 109-1 in accordance with the corresponding weighting factor(s) during generation of the next frame input description 113-1 for the storyboard.

In some embodiments, within the context of connection of the AI-based storyboard generator to a video game, the third AI model (AI3) is trained with knowledge about the video game environment and the player actions and interactions within the video game environment so as to enable generation of the next frame input description 113-1 in a manner that is meaningful and applicable to play of the video game. Also, in some embodiments, within the context of connection of the AI-based storyboard generator to a video game, the third AI model (AI3) is configured to generate the next frame input description 113-1 based at least in part on one or more actions of a given player within the video game.

After the next frame input description 113-1 is generated by the third AI model (AI3), the AI-based storyboard generator conveys the next frame input description 113-1 as the current image generation input to the first AI model (AI1) and executes the first AI model (AI1) to automatically generate a current frame image 109-$x$ (where $2 \leq x \leq N$, and N equals the total number of frames in the storyboard) based on the received current image generation input, as indicated by arrow 114-($x$-1). The current frame image 109-$x$ and, optionally, the current image generation input are stored together to define a next frame of the storyboard. It should be understood that while the current frame image 109-$x$ is based on the current image generation input, the current frame image 109-$x$ includes some content beyond what is specifically characterized by the current image generation input.

After the current frame image 109-$x$ is generated by the first AI model (AI1), the AI-based storyboard generator conveys the current frame image 109-$x$ as input to the second AI model (AI2) and executes the second AI model (AI2) to automatically generate a description 111-$x$ of the current frame image 109-$x$, as indicated by arrow 110-$x$. In some embodiments, like the description 111-1 of the first frame image 109-1, the description 111-$x$ of the current frame image 109-$x$ is a natural language description of whatever is depicted in the current frame image 109-$x$ with regard to any feature or characteristic that can be used to describe the current frame image 109-$x$. It should be understood that the description 111-$x$ of the current frame image 109-$x$ is different (in terms of both what it is and what it contains) than the current image generation input used by the first AI model (AI1) to generate the current frame image 109-$x$.

After the description 111-$x$ of the current frame image 109-$x$ is generated by the second AI model (AI2), the AI-based storyboard generator conveys the description 111-$x$ of the current frame image 109-$x$ as input to the third AI model (AI3) and executes the third AI model (AI3) to automatically generate a next frame input description 113-$x$, as indicated by arrow 112-$x$. In some embodiments, the next frame input description 113-$x$ is a textual statement of what happens next in the storyboard based on the description 111-$x$ of the current frame image 109-$x$.

A given frame round $x$ is defined by the sequence of executing the first AI model (AI1) to generate the current frame image 109-$x$ based on the next frame input description 113-($x$-1), followed by executing the second AI model (AI2) to generate the description 111-$x$ of the current frame image 109-$x$, followed by executing the third AI model (AI3) to generate the next frame input description 113-$x$, and setting the next frame input description 113-$x$ as the current image generation input for the next frame round ($x$+1). In the free-run mode, the AI-based storyboard generator runs continuously and automatically to generate a total of N frames for the storyboard, unless stopped prematurely by user activation of the stop control 115. Therefore, in the free-run mode, a total of N frame rounds are performed by the AI-based storyboard generator, where the $N^{th}$ frame round is a partial frame round due to execution of the third AI model (AI3) being unnecessary.

In some embodiments, the user interface 100A includes a render control 128 that upon activation by the user will trigger rendering of the generated storyboard as it currently exists into a format that is displayable to a user of the AI-based storyboard generator. In some embodiments, if the AI-based storyboard generator is running in free-run mode, activation of the render control 128 will stop generation of the storyboard (as if the stop control 115 had been activated) and trigger rendering of the generated storyboard as it currently exists into the format that is displayable to the user of the AI-based storyboard generator. In some embodiments, the generated storyboard is rendered into a sequence of frame images (corresponding to frames 1 to N) with a corresponding text caption associated with each frame image. In some embodiments, the text caption associated with a given frame image is the current image generation input that was used by the first AI model (AI1) to generate the given frame image.

In some embodiments, the user interface 100A includes a frame round selection control 119 that can be moved by a user along a linear path 121 in either a backward direction 123A or a forward direction 123B to specify a particular frame round of the storyboard for selection. The user interface 100A also includes a regeneration control 125 that is associated with the frame round selection control 119. Activation of the regeneration control 125 by the user will cause the AI-based storyboard generator to generate a new storyboard that includes newly generated frames after the particular frame round that is currently specified by the frame round selection control 119. More specifically, for a given frame round R specified by the frame round selection control 119, the new storyboard resulting from activation of the regeneration control 125 includes the previously existing frames 1 to through R (that existed when the regeneration control 125 was activated), plus newly generated frame(s) (R+1) to N. In some embodiments, the user identifies a departure frame X in the set of frames 1 to N of the previously generated storyboard at which the content of the previously generated storyboard deviated from what is considered acceptable or desirable. The user sets the frame round selection control 119 to the frame round (X−1) just before the departure frame, such that the frame round (X−1) is the above-mentioned given frame round R. Then, the user activates the regeneration control 125 to generate new storyboard frames X to N, such that the resulting storyboard includes previously generated frames 1 to R followed by newly generated frames X to N.

In some embodiments, the user interface 100A includes a controls control 127 that when activated by the user will trigger display of a controls input interface for the AI-based storyboard generator. FIG. 2 shows an example of a controls input interface 200 that is displayed upon activation of the controls control 127, in accordance with some embodiments. The controls input interface 200 provides for user specification of various control parameters that affect how the AI-based storyboard generator operates to generate the storyboard. For example, in some embodiments, the controls input interface 200 includes a maximum number (N) of frames input field 201 in which the user can specify the maximum number of frames to be generated in the storyboard. In some embodiments, the controls input interface 200 includes a maximum generator run time input field 203 in which the user can specify the maximum number of minutes over which the AI-based storyboard generator is allowed to operate to generate a storyboard. In some embodiments, the controls input interface 200 includes a number of frame options per frame round input field 205 in which the user can specify the number of frame image options that are to be generated by the first AI model (AI1) in each frame round 1 to N. The number of frame options per frame round input field 205 is described further with regard to FIG. 1C.

In some embodiments, the controls input interface 200 includes a rating restriction input field 207 in which the user can specify a rating restriction for the content that is allowable within the storyboard. In some embodiments, the rating restriction choices are similar to those for motion pictures, e.g., G, PG, PG-13, R, NC-17. However, in other embodiments, the AI-based storyboard generator can implement essentially any set of rating restriction choices. The rating restriction choice specified in the rating restriction input field 207 is provided as input to each of the first AI model (AI1), the second AI model (AI2), and the third AI model (AI3) to guide the automatic generation of the storyboard content.

In some embodiments, the controls input interface 200 includes a general mood input field 209 in which the user can specify the general mood to be conveyed by the content of the storyboard. The general mood description specifies an atmosphere that is to be created in the storyboard in order to convey a general feeling to a consumer of the storyboard. The general mood description specified in the general mood input field 209 is provided as input to each of the first AI model (AI1), the second AI model (AI2), and the third AI model (AI3) to guide the automatic generation of the storyboard content.

In some embodiments, the controls input interface 200 includes a general tone input field 211 in which the user can specify the general tone to be applied in generating the storyboard. The general tone description specifies an attitude or perspective followed by the AI-based storyboard generator in generating the storyboard. The general tone description specified in the general tone input field 211 is provided as input to each of the first AI model (AI1), the second AI model (AI2), and the third AI model (AI3) to guide the automatic generation of the storyboard content.

In some embodiments, the controls input interface 200 includes a general setting input field 213 in which the user can specify the general setting used for generation of the storyboard. The general setting description specifies location, environment, and/or time period, among other parameters, to be applied by the AI-based storyboard generator in generating the storyboard. The general setting description specified in the general setting input field 213 is provided as input to each of the first AI model (AI1), the second AI model (AI2), and the third AI model (AI3) to guide the automatic generation of the storyboard content.

In some embodiments, the controls input interface 200 includes a genre input field 215 in which the user can specify the genre of the storyboard to be generated. In some embodiments, example genre selections include action, drama, horror, science-fiction, sports, war, westerns, comedy, crime, romance, cartoon, comic book, graphic novel, among others. The genre specified in the genre input field 215 is provided as input to each of the first AI model (AI1), the second AI model (AI2), and the third AI model (AI3) to guide the automatic generation of the storyboard content.

In some embodiments, the controls input interface 200 includes an input field 217 for user specification of one or more other general attribute(s) to be followed by the AI-based storyboard generator in generating the storyboard. The attribute(s) specified in the other general attribute input field 217 is/are provided as input to each of the first AI model (AI1), the second AI model (AI2), and the third AI model (AI3) to guide the automatic generation of the storyboard content.

In some embodiments, the controls input interface 200 also includes a number (W) of keyword input fields 219-1 to 219-W and a corresponding number (W) of weighting factor input fields 221-1 to 221-W in which the user can specify a number of keywords and their corresponding weighting factors for use by the AI-based storyboard generator in generating the storyboard. In some embodiments, the weighting factors are input on a scale of 1 to 100, where 100 indicates highest emphasis and 1 indicates lowest emphasis. In some embodiments, the AI-based storyboard generator normalizes the number (W) of weighting factors across the number (W) of keywords. The keyword(s) specified in the keyword input fields 219-1 to 219-W and their corresponding weightings based on the weighting factor(s) specified in the weighting factor input fields 221-1 to 221-W are provided as input to one or more of the first AI model (AI1), the second AI model (AI2), and the third AI model (AI3) to guide the automatic generation of the storyboard content.

It should be understood that the control parameters depicted in the example controls input interface 200 are provided by way of example. In some embodiments, a subset of the control parameters depicted in the example controls input interface 200 are implemented. Also, in some embodiments, the controls input interface 200 can be expanded to include essentially any control parameter that is capable of influencing how the AI-based storyboard generator operates to automatically generate the storyboard.

Figure 1B:
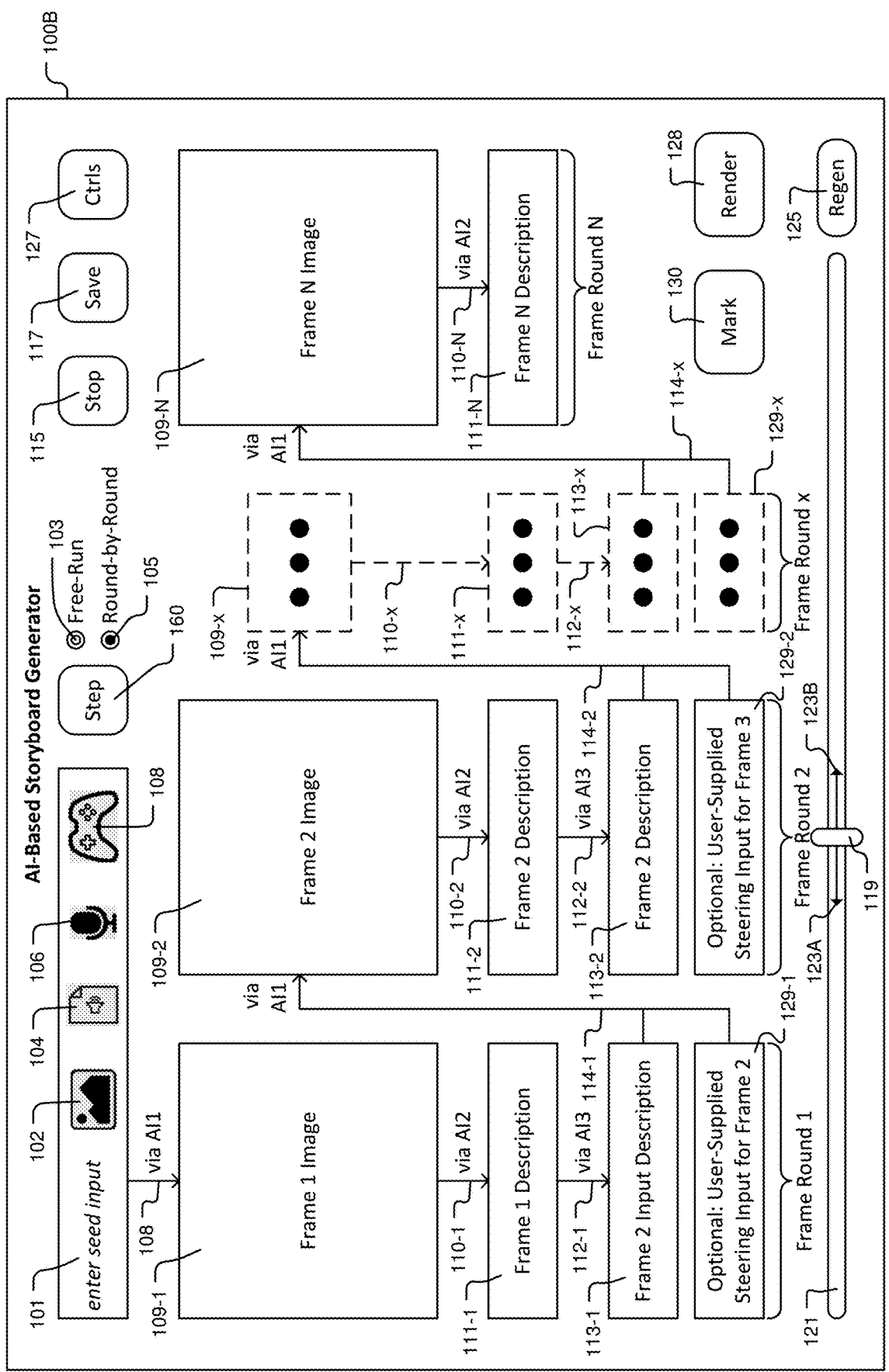
FIG. 1B shows a user interface for the AI-based storyboard generator set to operate in the round-by-round mode, in accordance with some embodiments.

FIG. 1B shows a user interface 100B for the AI-based storyboard generator set to operate in the round-by-round mode, in accordance with some embodiments. The user interface 100B corresponds to selection of the round-by-round mode selection control 105, as opposed to selection of the free-run control 103. The user interface 100B also corresponds to specification of the number one (1) in number of frame options per frame round input field 205 of the controls input interface 200 of FIG. 2, such that one (1) frame image is generated by the first AI model (AI1) in each frame round 1 to N. The user interface 100B is similar to the user interface 100A as described with regard to FIG. 1A, with a few exceptions. The go control 107 in the user interface 100A is replaced by a step control 160. In the round-by-round operation mode of the AI-based storyboard generator, the storyboard generation pauses at the end of each frame round, e.g., after the third AI model (AI3) outputs the next frame input description 113-$x$. User activation of the step control 160 after a given frame round x directs the AI-based storyboard generator to proceed with execution of a next frame round (x+1). The user interface 100B also includes a user-supplied steering input field 129-$x$ for each frame round 1 to (N−1). The user-supplied steering input field 129-$x$ provides for user input of descriptive information to guide the first AI model (AI1) in generating the frame image for the next frame round. Both the next frame input description 113-$x$ and the descriptive information provided by the user in the user-supplied steering input field 129-$x$ are provided as input to the first AI mode (AI1) to affect generation of the frame image for the next frame round (x+1). In this manner, the user is able to manually supervise and guide the storyboard generation by the AI-based storyboard generator. It should be understood that AI-based storyboard generator automatically generates the storyboard content for each frame round even though the user is able to provide guidance to the AI-based storyboard generator at the end of each frame round. Therefore, even in the round-by-round operation mode, the resulting storyboard is considered to be automatically generated by the AI-based storyboard generator.

Figure 3:
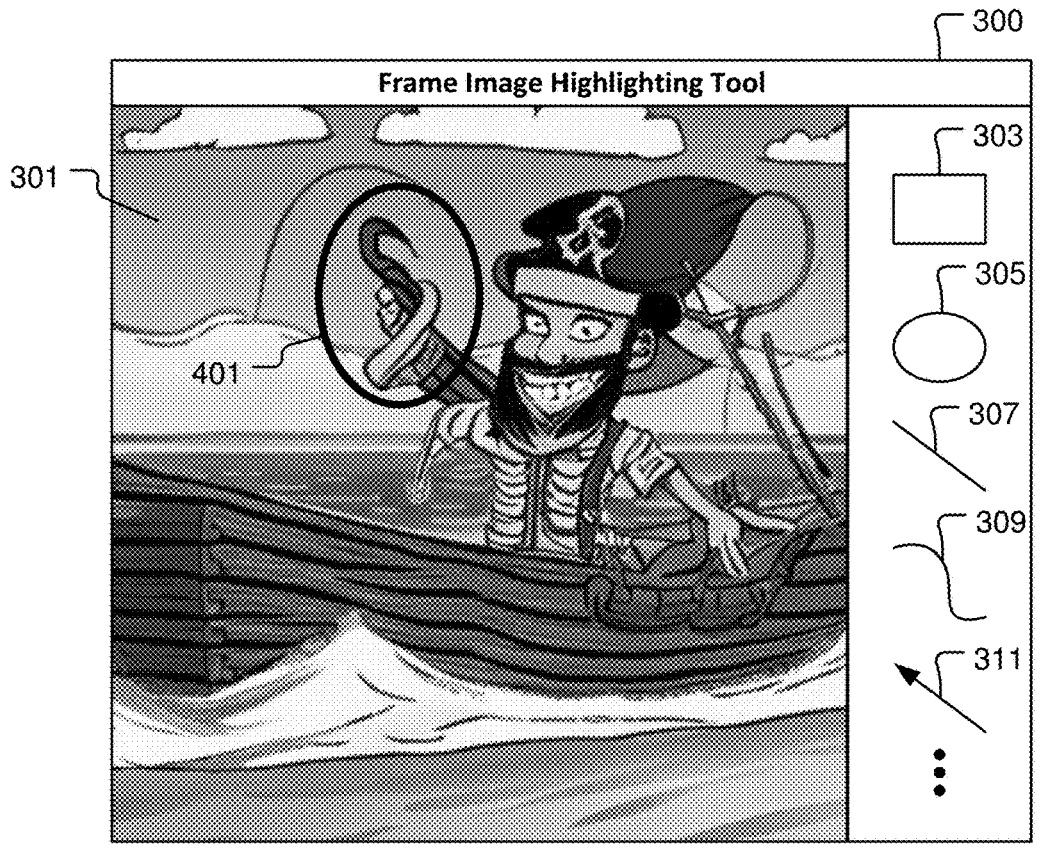
FIG. 3 shows an example user interface for highlighting one or more portions of a user-selected frame image, in accordance with some embodiments.

The user interface 100B also includes a mark control 130 that when activated will trigger display of a user interface for highlighting one or more portions of the current frame image that is/are to be emphasized or focused on by the AI-based storyboard generator in execution of the next frame round. For example, when the storyboard generation process is paused after execution of frame round x, activation of the mark control 130 will trigger display of a user interface for highlighting one or more portion(s) of the current frame image 109-$x$. FIG. 3 shows an example user interface 300 for highlighting one or more portion(s) of a user-selected frame image 109-$x$, in accordance with some embodiments. The user interface 300 includes a frame display region 301 in which the user-selected frame image 109-$x$ is displayed. The user interface 300 also includes one or more highlighting tools for use by the user in highlighting one or more portions of the user-selected frame image 109-$x$ shown in the frame display region 301. The highlighting tools in the example of FIG. 3 includes a box drawing tool 303, an ellipse drawing tool 305, a straight line drawing tool 307, a free-form line drawing tool 309, and an arrow drawing tool 311. It should be understood that in various embodiments the user interface 300 can include a subset of the highlighting tools shown in the example of FIG. 3, or can include more highlighting tools than what are shown in the example of FIG. 3. The example of FIG. 3 shows how the ellipse drawing tool 305 is used to draw an ellipse 401 around the hook hand of the pirate. The ellipse 401 indicates to the AI-based storyboard generator that emphasis or focus is to be placed on the content of the user-selected frame image 109-x that is shown inside the ellipse when the next frame image is generated by the first AI model (AI1). Similar treatments are provided by the AI-based storyboard generator for boxes drawn using the box drawing tool 303, lines and/or shapes drawn using the line drawings tools 309 and/or 309, and arrows drawn using the arrow drawing tool 311. It should be understood that the user interface 300 for highlighting one or more portion(s) of the current frame image 109-x provides a means for the user to guide the story that is being conveyed by storyboard that is being generated by the AI-based storyboard generator.

Figure 1C:
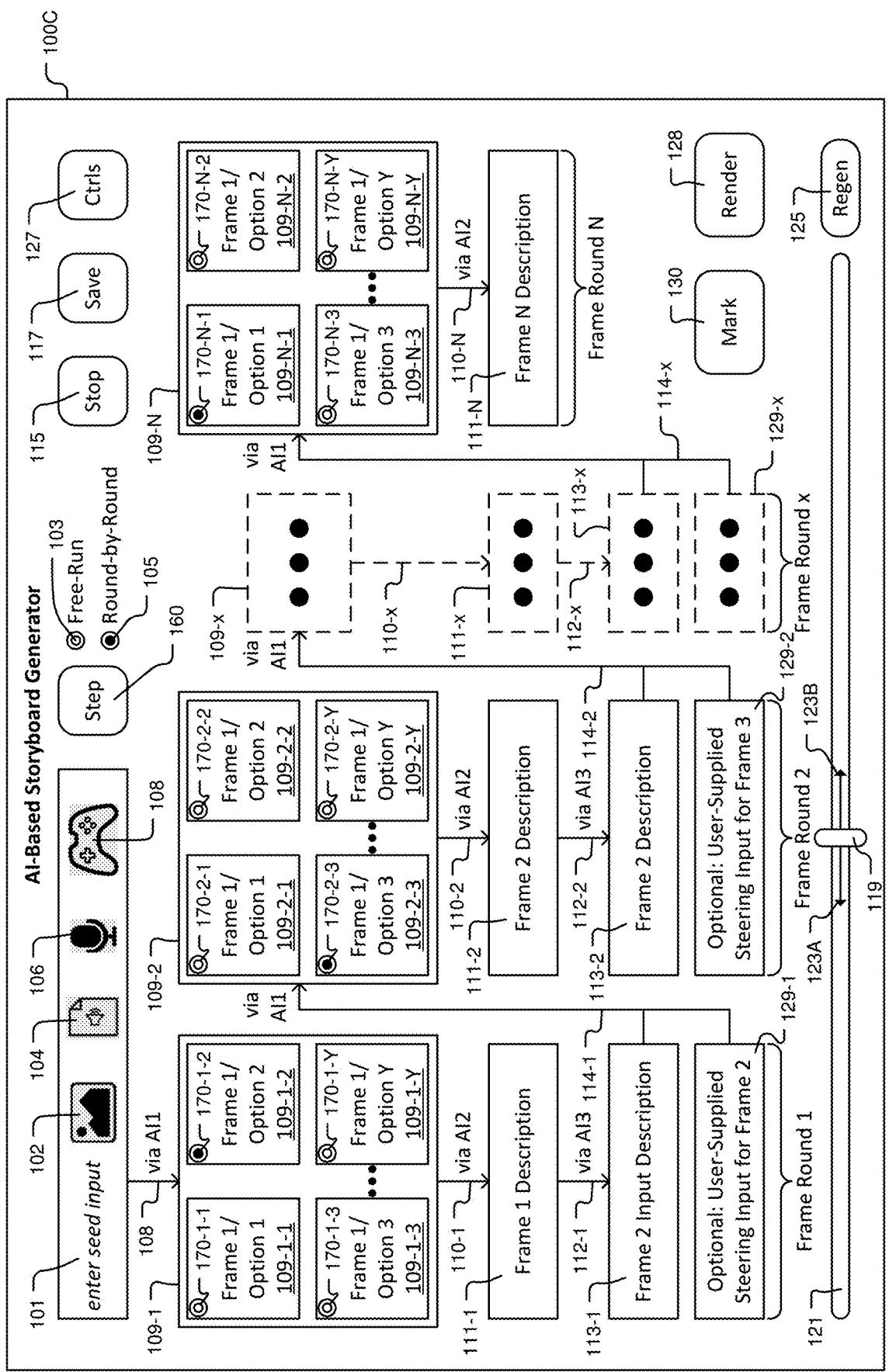
FIG. 1C shows a user interface for the AI-based storyboard generator set to operate in the round-by-round mode with specification of the number four (4) in the number of frame options per frame round input field of FIG. 2, in accordance with some embodiments.
Figure 2:
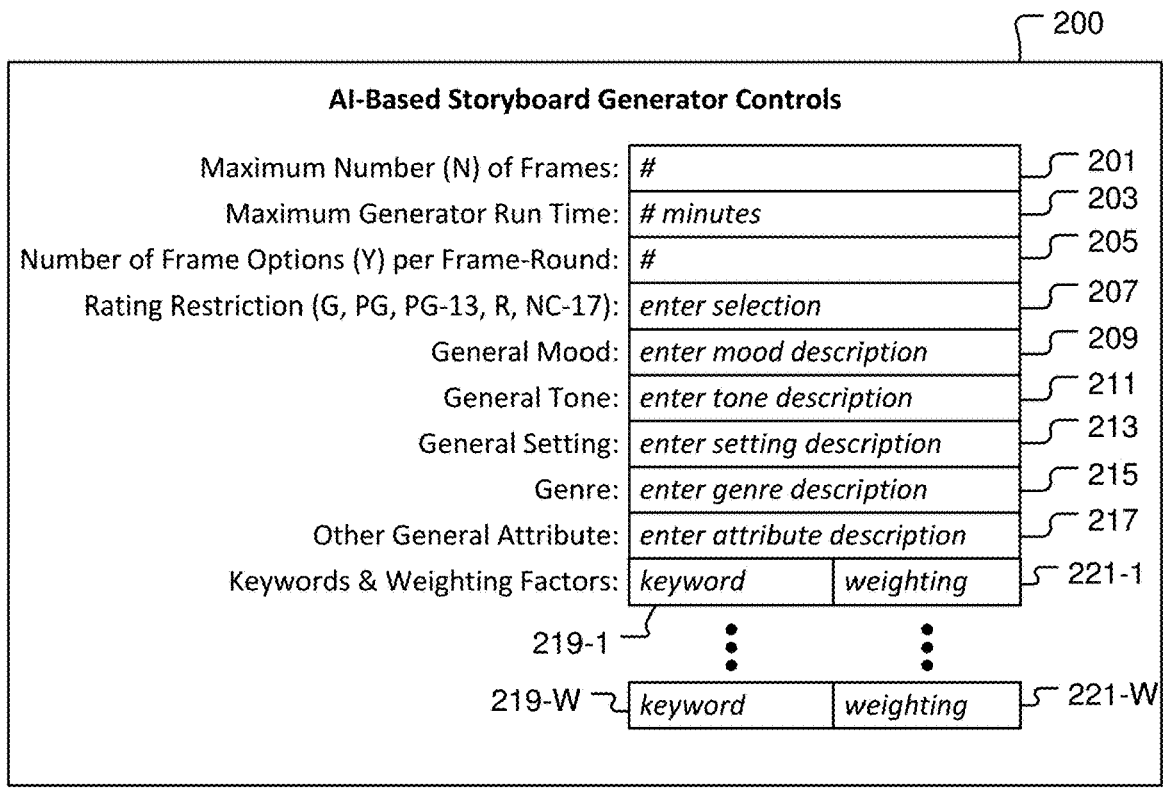
FIG. 2 shows an example of a controls input interface that is displayed upon activation of the controls control, in accordance with some embodiments.

FIG. 1C shows a user interface 100C for the AI-based storyboard generator set to operate in the round-by-round mode with specification of the number four (4) in the number of frame options per frame round input field 205 of FIG. 2, in accordance with some embodiments. The user interface 100C is like the user interface 100B as described with regard to FIG. 1B, with the exception that four frame image options are generated in each of the frame rounds 1 to N. Specifically, in each frame round 1 to N, the first AI model (AI1) generates Y options 109-x-y for the current frame image, where Y is the number entered in the number of frame options per frame round input field 205, and where x is the frame round number and y is the frame image option number. While the user interface 100C shows an example with the number Y equal to four, it should be understood that in various embodiments the number Y of current frame image options generated by the first AI model (AI1) for each frame round can be any integer number greater than zero. When the number Y in the number of frame options per frame round input field 205 is greater than one, the AI-based storyboard generator pauses in each frame round after the first AI model (AI1) generates the Y options for the current frame image. The user selects one of the Y options as the current frame image. The user interface 100C includes a selection control 170-x-y for each current frame option 109-x-y, where x is the current frame round number in the set of 1 to N, and y is the current frame image option number in the set of 1 to Y. The user interface 100C is configured to allow for selection of any one of the current frame options 109-x-1 to 109-x-Y as the current frame image 109-x through user activation of one of the selection controls 170-x-1 to 170-x-Y.

Upon selection of one of the Y current frame options 109-x-1 to 109-x-Y as the current frame image 109-x by the user, the AI-based storyboard generator continues execution of the current frame round and pauses again at the end of the current frame round to allow for additional user input through the user-supplied steering input field 129-x and/or the user interface 300 for highlighting one or more portions of the current frame image 109-x. In some embodiments, the AI-based storyboard generator continues execution of the current frame round automatically upon user selection of one of the Y current frame options 109-x-1 to 109-x-Y as the current frame image 109-x. In some embodiments, the user activates the step control 160 to direct the AI-based storyboard generator to continue execution of the current frame round after the user selects one of the Y current frame options 109-x-1 to 109-x-Y as the current frame image 109-x.

Figure 4:
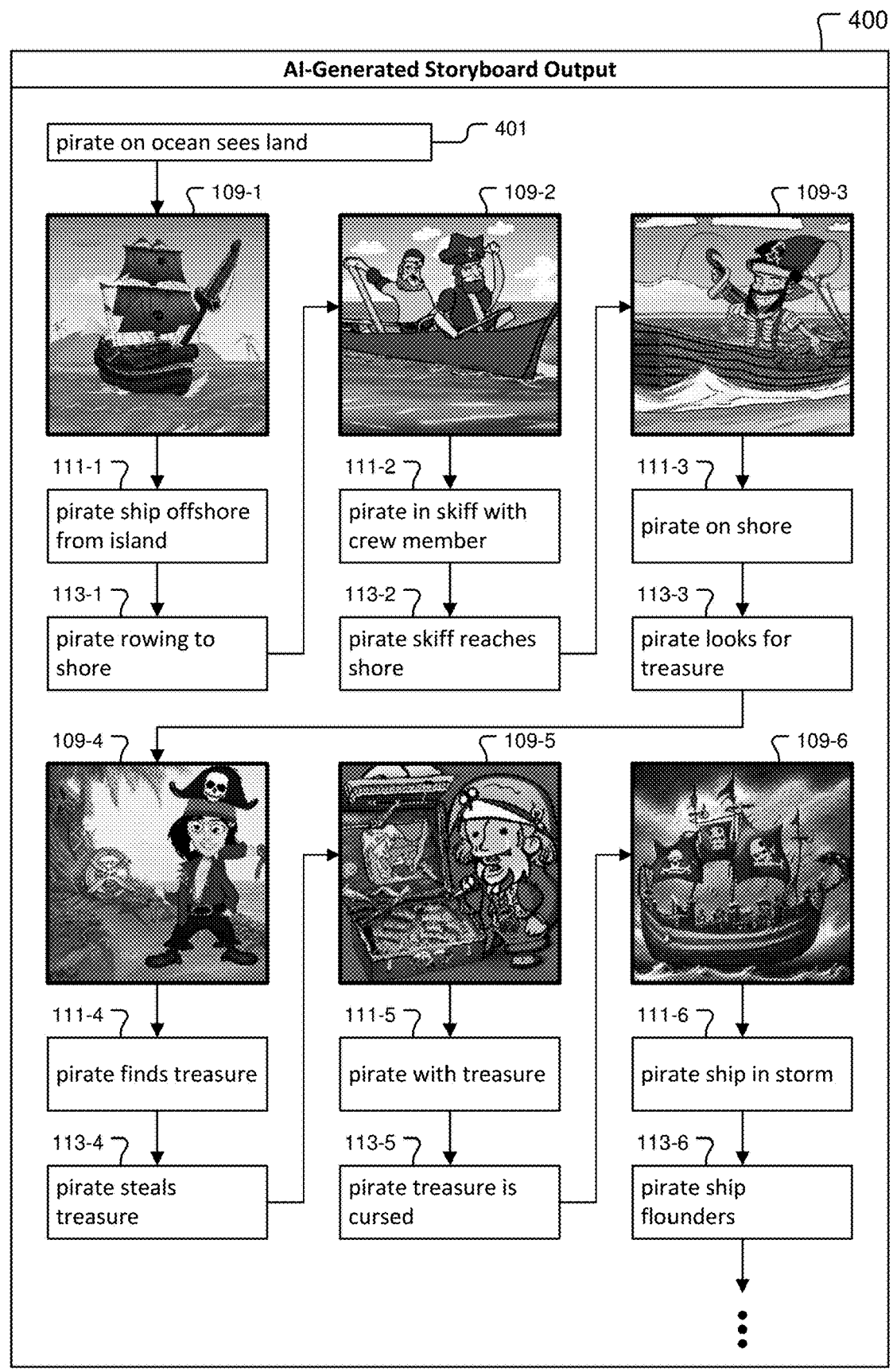
FIG. 4 shows an example storyboard generated by the AI-based storyboard generator, in accordance with some embodiments.

FIG. 4 shows an example storyboard 400 generated by the AI-based storyboard generator, in accordance with some embodiments. The example storyboard 400 represents an example of the output generated upon activation of the render control 128 in the user interfaces 100A, 100B, 100C. The example storyboard 400 shows the initial seed input 401 for the AI-based storyboard generation process. The example storyboard 400 shows each of the generated frame images 109-x for each x in the frame set 1 to N. In some embodiments, the example storyboard 400 shows each of the descriptions 111-x of the frame images 109-x as generated by the second AI model (AI2). In some embodiments, the example storyboard 400 shows each of the frame input descriptions 113-x as generated by the third AI model (AI3). In some embodiments, the frame input descriptions 113-x are paired with the corresponding frame images 109-x to create a narrated story.

In some embodiments, a coherency engine is used to apply coherency to the frame images 109-x generated by the first AI model (AI1) across the storyboard. In some embodiments, coherency refers to maintaining a specified level of uniformity in how persons, characters, and/or objects are depicted within the different frame images 109-x of the storyboard. In some embodiments, the coherency engine is implemented by a fourth AI model (AI4). Also, in some embodiments, an animation engine is used to create animation between two successive frame images 109-x with the storyboard. In some embodiments, the output of the animation engine is a video clip. In some embodiments, the animation engine is implemented by a fifth AI model (AI5).

Figure 5:
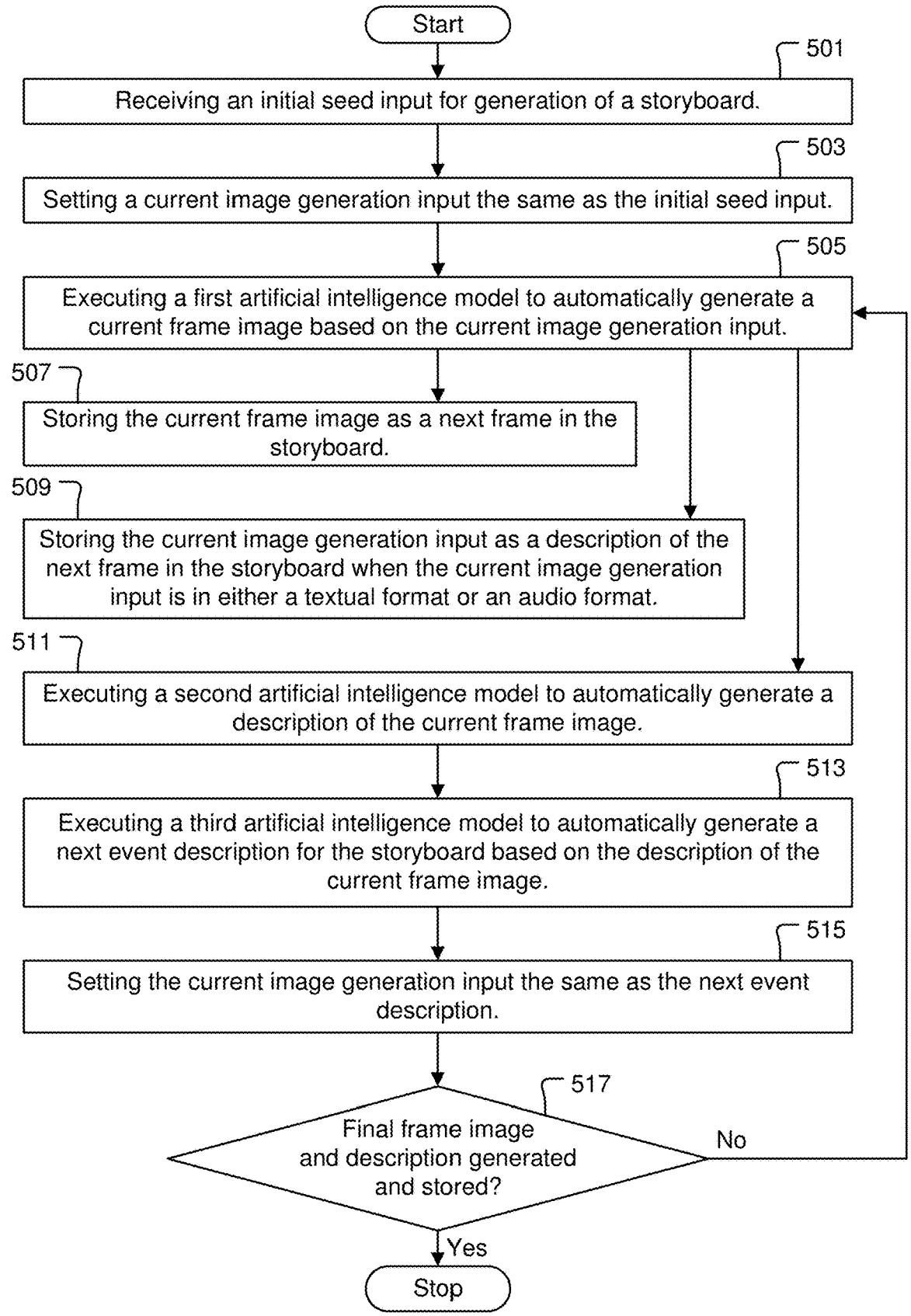
FIG. 5 shows a method for AI-based storyboard generation, in accordance with some embodiments.

FIG. 5 shows a method for AI-based storyboard generation, in accordance with some embodiments. The method includes an operation 501 for receiving an initial seed input for generation of a storyboard, such as through the seed input control 101. In some embodiments, the initial seed input is in a textual format. In some embodiments, the initial seed input is in an image format. In some embodiments, the initial seed input is in an audio format. In some embodiments, the initial seed input is one or more of a description of a scene within a video game, a status of a player within the video game, and an action of the player within the video game. In some embodiments, the initial seed input is received directly from the video game by the AI-based storyboard generator. The method continues with an operation 503 for setting a current image generation input the same as the initial seed input. In other words, the current image generation input is set identical to the initial seed input. The method continues with an operation 505 for executing the first AI model (AI1) to automatically generate a current frame image based on the current image generation input. It should be understood that the current frame image as generated by the first AI model (AI1) includes some content beyond the current image generation input that was provided as input to the first AI model (AI1). The method includes an operation 507 for storing the current frame image as generated by the first AI model (AI) as a next frame in the storyboard. The method also includes an operation 509 for storing the current image generation input (which was just provided as input the first AI model (AI)) as a description of the next frame in the storyboard when the current image generation input is in either a textual format or an audio format. In some embodiments, for the first frame of the storyboard, if the initial seed input is in a format other than either textual or audio, e.g., if the initial seed input is in an image format or a video game data format, the operation 509 may be skipped for the first frame of the storyboard. In some embodiments, the operations 507 and 509 are performed in either a sequential manner or parallel manner right after completion of the operation 505. However, in other embodiments, the operations 507 and 509 are performed in either a sequential manner or parallel manner at any time during execution of the method up to and before a point in time when the current image generation input needs to be changed (in operation 515).

After the operation 505 is completed, the method continues with an operation 511 for executing the second AI model (AI2) to automatically generate a description of the current frame image that was just output by the first AI model (AI1). It should be understood that the description of the current frame image as generated by the second AI model (AI2) is different than the current image generation input that was provided as input to the second AI model (AI2). After the operation 511, the method continues with an operation 513 for executing a third AI model (AI3) to automatically generate a next frame input description for the storyboard based on the description of the current frame image that was just output by the second AI model (AI2). After the operation 513, the method continues with an operation 515 for setting the current image generation input the same as the next frame input description that was just output by the third AI model (AI3).

The method continues with an operation 517 for determining whether or not a final frame image and description has been generated and stored for the storyboard. If operation 517 determines that the final frame image and description has been generated and stored, then the method concludes. If operation 517 determines that the final frame image and description has not been generated and stored, then the method reverts back the operation 505 to proceed with generation of a next frame round. In some embodiments, the determination of operation 517 is done by comparing a most recently generated frame number to maximum number (N) of frames as specified in the controls input interface 200 to check whether or not the $N^{th}$ frame (final frame) has been generated and stored, which will trigger stopping of the method. In some embodiments, the determination of operation 517 is done by checking a run time of the AI-based storyboard generator in performing the method of FIG. 5 against a maximum generator run time as specified in the controls input interface 200 to check whether or not the maximum generator run time has been reached or exceeded, which will trigger stopping of the method. In some embodiments, the method of FIG. 5 is performed so that operations 505 through 515 are repeated automatically and sequentially until a stop condition is reached that corresponds to generation and storage of the final ($N^{th}$) frame image and the description of the final ($N^{th}$) frame image, where the operation 517 determines whether or not the stop condition is reached. In some embodiments, the stop condition is one or more of the maximum number (N) of frames as specified in input field 201 of FIG. 2, and the maximum duration for generation of the storyboard as specified in input field 203 of FIG. 2.

Figure 6:
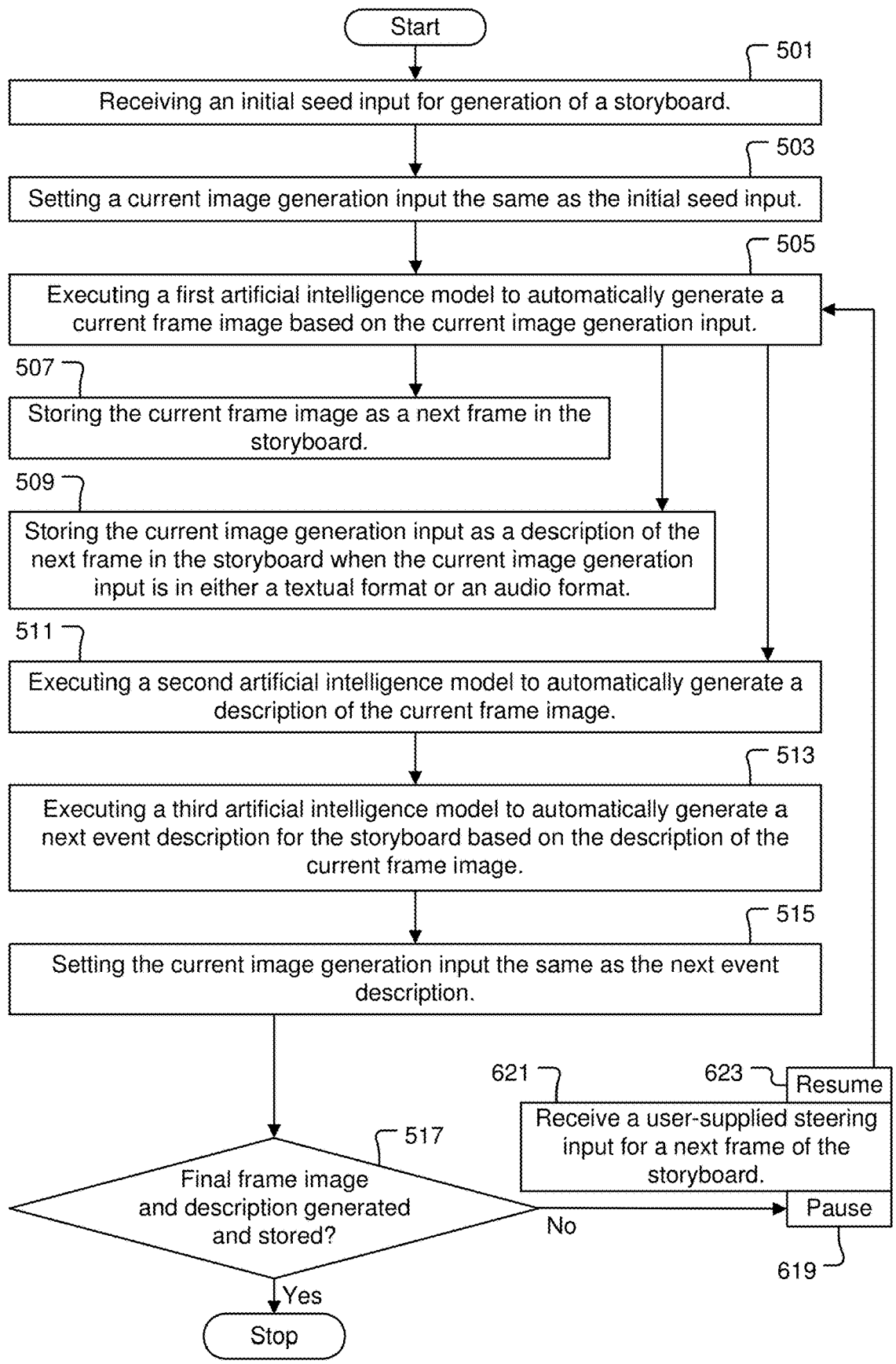
FIG. 6 shows another method for artificial intelligence-based storyboard generation, in accordance with some embodiments.

FIG. 6 shows another method for artificial intelligence-based storyboard generation, in accordance with some embodiments. The method of FIG. 6 is a variation of the method of FIG. 5. The previously described operations 501, 503, 505, 507, 509, 511, 513, 515, and 517 in the method of FIG. 5 are the same in the method of FIG. 6. The method of FIG. 6 differs from the method of FIG. 5 in that after the operation 517 determines the that final frame image and description of the storyboard has not been generated and stored, the method proceeds with an operation 619 for pausing generation of the storyboard to allow for receipt of some user-supplied steering input. The method then proceeds with an operation 621 in which some user-supplied steering input for a next frame of the storyboard is received. The method then continues with an operation 623 in which generation of the storyboard resumes with performance of the operation 505, such that operation of the first AI model (AI) to generate the current frame image is based on both the description of the current frame image and the user-supplied steering input received in operation 621.

In some embodiments, the user-supplied steering input received in the operation 621 is in a textual format. In some embodiments, the user-supplied steering input received in the operation 621 is in an audio format. In some embodiments, the operation 621 includes receiving a user input specifying a user-highlighted portion of a user-selected frame image. In these embodiments, the user-supplied steering input is some content identified within the user-highlighted portion of the user-selected frame image. In some of these embodiments, the second AI model (AI2) (e.g., the discriminator AI model) is used to identify content within the user-highlighted portion of the selected frame image.

In some embodiments, the methods of FIGS. 5 and/or 6 include(s) an operation for applying a weighting factor to a keyword within the description of the current frame image as generated by the second AI model (AI2) in the operation 511. In these embodiments, the third AI model (AI3) is configured to apply emphasis to the keyword within the description of the current frame image in accordance with the weighting factor during generation of the next frame input description for the storyboard. In some embodiments, the methods of FIGS. 5 and/or 6 include(s) an operation for providing game state data as input to the third AI model (AI3). In these embodiments, the third AI model (AI3) is configured to generate the next frame input description for the storyboard based on the game state data.

In some embodiments, the operation 505 in the methods of FIGS. 5 and/or 6 include(s) executing the first AI model (AI1) to automatically generate multiple current frame image options based on the current image generation input that is provided as input to the first AI model (AI1). In these embodiments, the method includes pausing generation of the storyboard after the operation 505 is performed. During this pause, the method includes receiving a user input specifying a selected one of the multiple current frame image options as just generated by the first AI model (AI1). The method then continues by setting the current frame image as the selected one of the multiple current frame image options. The method then continues with performance of the operation 511, along with performance of operations 507 and 509.

In some embodiments, the methods of FIGS. 5 and/or 6 include(s) receiving a user input selecting one previously generated frame as a regeneration start frame, such as through use of the frame round selection control 119. In these embodiments, the method also includes setting the current frame image as the regeneration start frame, followed by resuming performance of the method with operation 511. It should be understood that this embodiment provides for generation of a new storyboard that includes some previously generated storyboard content up the regeneration start frame followed by some newly generated storyboard contact after the regeneration start frame.

In some embodiments, the methods of FIGS. 5 and/or 6 include(s) an operation for receiving one or more user-supplied storyboard constraint inputs. The controls input interface 200 of FIG. 2 is an example of how the one or more user-supplied storyboard constraint inputs can be provided to the AI-based storyboard generator. The user-supplied steering input field 129-x is another example of how the one or more user-supplied storyboard constraint inputs can be provided to the AI-based storyboard generator. The user interface 300 for highlighting one or more portion(s) of a user-selected frame image 109-x is another example of how the one or more user-supplied storyboard constraint inputs can be provided to the AI-based storyboard generator. In these embodiments, the method includes providing the one or more user-supplied storyboard constraint inputs as input to each of the first AI model (AI1), the second AI model (AI2), and third AI model (AI3).

Figure 7A:
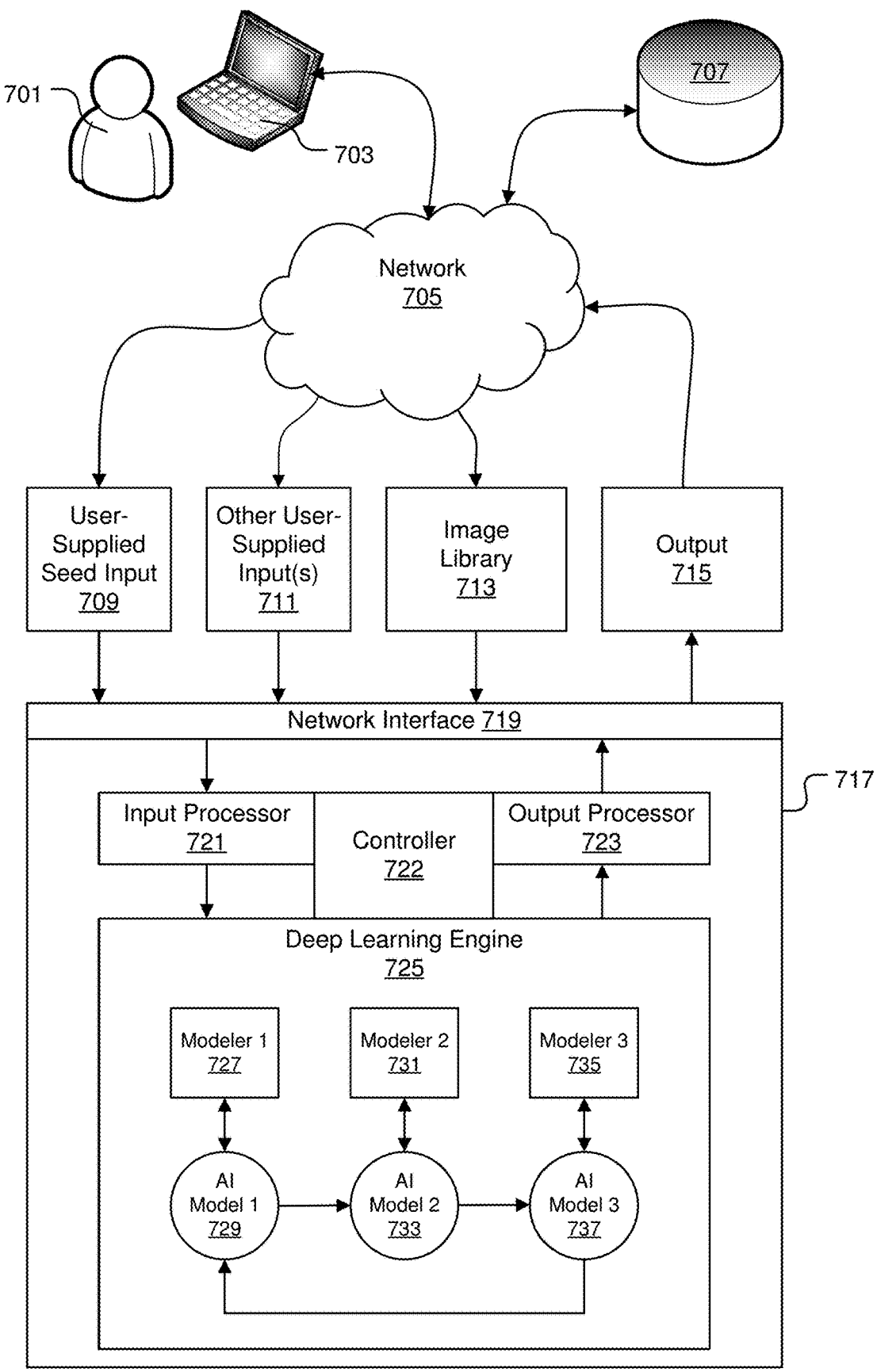
FIG. 7A shows a system diagram of an AI-based storyboard generator, in accordance with some embodiments.

FIG. 7A shows a system diagram of an AI-based storyboard generator 717, in accordance with some embodiments. The AI-based storyboard generator 717 is configured to provide for automatic AI-based generation of a storyboard by provisioning and executing the user interfaces 100A, 100B, and 100C of FIGS. 1A, 1B, and 1C, respectively, and by performing the methods of FIGS. 5 and 6. In some embodiments, the AI-based storyboard generator 717 is in bi-directional data communication with a client computing system 703 through a network 705, e.g., Internet. Also, in some embodiments, the AI-based storyboard generator 717 is in bi-directional data communication with a data storage system 707 through the network 105. In some embodiments, a user 701 working at the client computing system 703 provides input to the AI-based storyboard generator 717 by way of the network 705. For example, the user 701 provides an initial seed input 709 for the AI-based storyboard generation process as input to the AI-based storyboard generator 717 by way of the network 705. Also, the user 701 is able to monitor and control generation of the storyboard by the AI-based storyboard generator 717 through the user interfaces 100A, 100B, 100C, 200, and 300, which are displayed in an interactively operable manner on the client computing system 703. The AI-based storyboard generator 717 is also configured to receive other user-supplied input(s) 711 from the user by way of the client computer system 703 and network 705. In some embodiments, the other user-supplied input(s) 711 includes the user specification for the various control parameters that are shown in the controls input interface 200. Also, in some embodiments, the other user-supplied input(s) 711 includes any user input that is received through the user interfaces 100A, 100B, 100C, 200, and 300. Also, in some embodiments, one or more image libraries 713 are provided as input to the AI-based storyboard generator 717. In some embodiments, the one or more image libraries are used as input by the first AI model (AI1) to generate the frame images for the storyboard. Also, the AI-based storyboard generator 717 is configured to provide output 715 to the client computing system 703 by way of the network 705. In some embodiments, the output 715 provided by the AI-based storyboard generator 717 includes the user interfaces 100A, 100B, 100C, 200, and 300 that are provided to the user 701 on the client computing system 703. Also, the output 715 includes the storyboard that is generated by the AI-based storyboard generator 717.

In some embodiments, the AI-based storyboard generator 717 includes a network interface 719 configured to receive and process incoming data communication signals/packets and prepare and transmit outgoing data communication signals/packets. In various embodiments, the network interface 719 is configured to operate in accordance with any known network/Internet protocol for data communication. In some embodiments, the AI-based storyboard generator 717 includes an input processor 721. The input processor 721 is configured to receive the inputs 709 and 711 from the user 701 by way of the network interface 719. In some embodiments, the input processor 721 operates to format the received inputs 709 and 711 for provision as input to a deep learning engine 725.

The deep learning engine 725 includes a first AI modeler 727 and the first AI model (AI1) 729. The deep learning engine 725 also includes a second AI modeler 731 and the second AI model (AI2) 733. The deep learning engine 725 also includes a third AI modeler 735 and the third AI model (AI3) 737. Each of the first modeler 727, the second modeler 731, and the third modeler 735 is configured to build and/or train the first AI model (AI1) 729, the second AI model (AI2) 733, and the third AI model (AI3) 737, respectively. In various embodiments, deep learning (also referred to as machine learning) techniques are used to build each of the first AI model (AI1) 729, the second AI model (AI2) 733, and the third AI model (AI3) 737 for use in automatic generation of the storyboard. In some embodiments, each of the first AI model (AI1) 729, the second AI model (AI2) 733, and the third AI model (AI3) 737 is trained based on some success criteria (e.g., user 701 approval of generated storyboard content), such as following one path over another similar path through the AI model that is more successful in terms of the success criteria. In some embodiments, the success criteria is validation/approval of a generated storyboard by the user 701. In this manner, each of the first AI model (AI1) 729, the second AI model (AI2) 733, and the third AI model (AI3) 737 learns to take the more successful path in generating storyboard content. In some embodiments, the training data for each of the first AI model (AI1) 729, the second AI model (AI2) 733, and the third AI model (AI3) 737 includes data that is relevant to understanding how the user 701 would go about creating a storyboard for a given initial seed input 709. Each of the first AI model (AI1) 729, the second AI model (AI2) 733, and the third AI model (AI3) 737 is continually refined through the continued collection of training data, and by comparing new training data to existing training data to facilitate use of the best training data based on the success criteria. Once sufficiently trained, each of the first AI model (AI1) 729, the second AI model (AI2) 733, and the third AI model (AI3) 737 can be used by the AI-based storyboard generator 717 for automatic storyboard generation.

In some embodiments, the AI-based storyboard generator 717 includes an output processor 723. In various embodiments, the output processor 723 is configured to receive the output generated by the deep learning engine 725 and prepare the output for transmission to the user 701 by way of the network interface 719 and/or for storage in the data store 707. In some embodiments, the data store 707 is also used for storing data associated with operation of the AI-based storyboard generator 717. It should be understood that the data store 707 can be either part of the AI-based storyboard generator 717, or can be a cloud data storage system that is accessible by the AI-based storyboard generator 717 over the network 705, or can be essentially any other type of data storage that is accessible by the AI-based storyboard generator 717.

In some embodiments, the AI-based storyboard generator 717 includes a controller 722 that is configured to manage the provision and operation of the user interfaces 100A, 100B, 100C, 200, and 300, as well as direct the operation of the deep learning engine 725 to perform the methods disclosed herein. The controller 722 is in data communication with each of the input processor 721, the output processor 723, and the deep learning engine 725. The controller 722 receives the user-supplied inputs 709 and 711 from the input processor 721, and uses the received user-supplied inputs 709 and 711 to direct generation of the storyboard in accordance with the methods of FIGS. 5 and/or 6. The controller 722 also directs the first AI model (AI1) 729 to generate and output a current frame image of a given frame round. The controller 722 also directs the second AI model (AI2) 733 to generate and output a description of the current frame image of the given frame round. The controller 722 also directs the third AI model (AI3) 737 to generate and output a next event description for the storyboard based on the current frame image and the description of the current frame image. The controller 722 also directs the output processor to prepare and transmit the output 715 to the client computing system 703 by way of the network 705.

It should be understood that the AI-based storyboard generator 717 configuration depicted in FIG. 7A is one example of many different ways in which the AI-based storyboard generator 717 can be configured to implement the various operations and methods disclosed herein. Therefore, it should be understood that the AI-based storyboard generator 717 can be implemented in ways that differ from what is specifically shown in FIG. 7A, so long as the AI-based storyboard generator 717 is implemented in a way that provides for execution of the various user interface, operations, and methods disclosed herein.

Figure 7B:
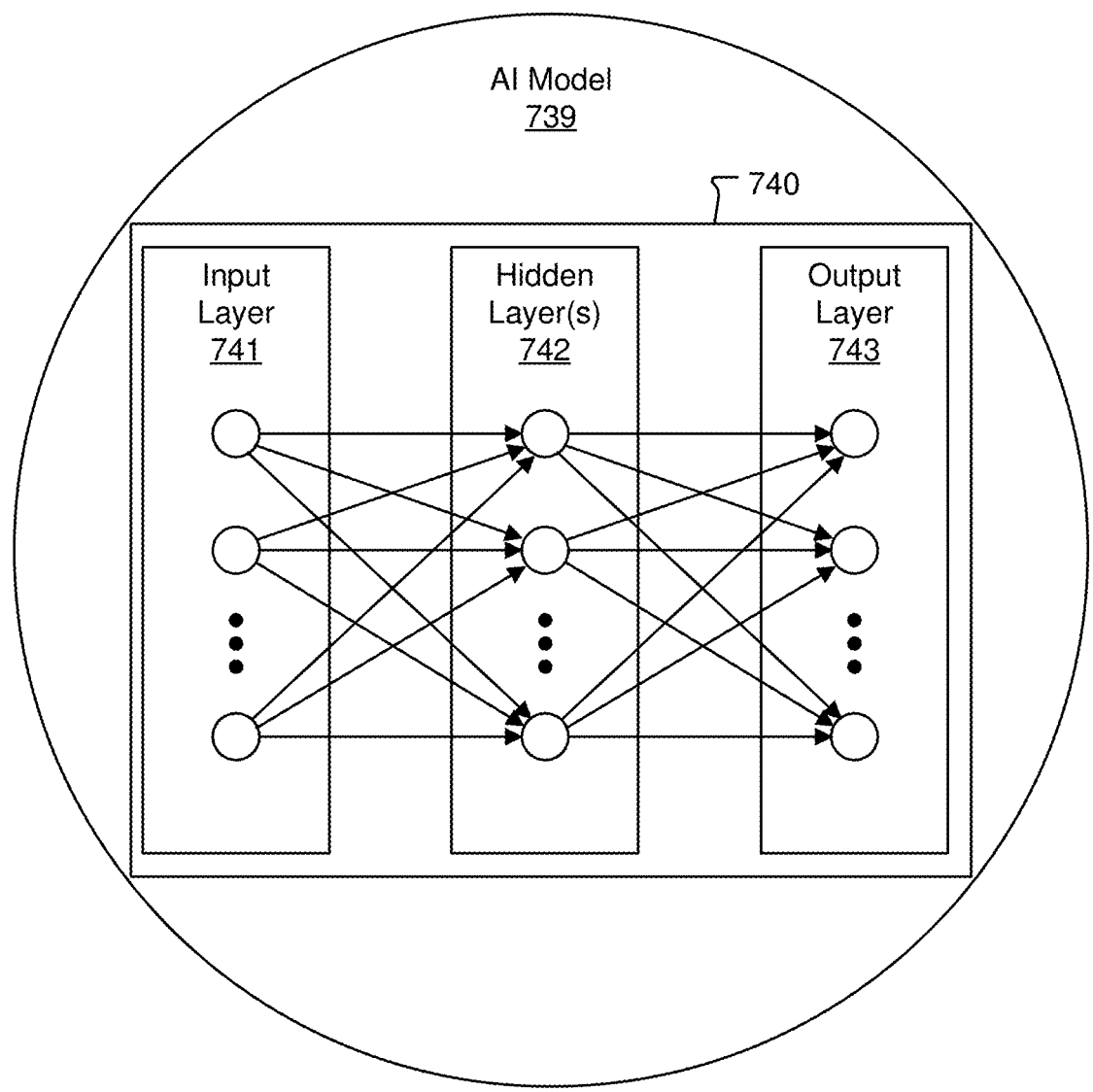
FIG. 7B shows an example AI model that implements a neural network, in accordance with some embodiments.

FIG. 7B shows an example AI model 739 that implements a neural network 740, in accordance with some embodiments. In some embodiments, the AI model 739 is representative of each of the first AI model (AI1) 729, the second AI model (AI2) 733, and the third AI model (AI3) 737. Given an input, the AI model 739 can analyze the input and provide an appropriate response to the input. For example, when the AI model 739 is trained as the first AI model (AI1) 729, the AI model 739 can be used to generate an image based on some descriptive input. Also, when the AI model 739 is trained as the second AI model (AI2) 733, the AI model 739 can be used to generate a description of an input image. Also, when the AI model 739 is trained as the third AI model (AI3) 737, the AI model 739 can be used to generate a description of a next event in a story based on some descriptive input. The first modeler 727 is configured to build the first AI model (AI1) 729 as needed to learn about the image generation process for a given context. The second modeler 731 is configured to build the second AI model (AI2) 733 as needed to learn about the image description generation process for a given context. The third modeler 735 is configured to build the third AI model (AI3) 737 as needed to learn about the story event description generation process for a given context. In various embodiments, the deep learning engine 725 utilizes AI, including deep learning algorithms, reinforcement learning, or other AI-based algorithms to build and train the first AI model (AI1) 729, the second AI model (AI2) 733, and the third AI model (AI3) 737. The deep learning engine 725 may be configured to continually refine the training of each of the first AI model (AI1) 729, the second AI model (AI2) 733, and the third AI model (AI3) 737 given any updated training data.

In various embodiments, the neural network 740 can be implemented as a deep neural network, a convolutional deep neural network, and/or a recurrent neural network using supervised or unsupervised training. In some embodiments, the neural network 740 includes a deep learning network that supports reinforcement learning, or rewards based learning (e.g., through the use of success criteria, success metrics, etc.). For example, in some embodiments, the neural network 740 is set up as a Markov decision process (MDP) that supports a reinforcement learning algorithm.

The neural network 740 represents a network of interconnected nodes, such as an artificial neural network. In FIG. 7A, each circle represents a node. Each node learns some information from the training data. Knowledge can be exchanged between the nodes through the interconnections.

In FIG. 7A, each arrow between nodes represents an interconnection. Input to the neural network 740 activates a set of nodes. In turn, this set of nodes activates other nodes, thereby propagating knowledge about the input. This activation process is repeated across other nodes until an output is provided. The example neural network 740 includes a hierarchy of nodes. At the lowest hierarchy level, an input layer 741 exists. The input layer 741 includes a set of input nodes. In some embodiments, intermediary predictions of the AI model 739 are determined through a classifier that creates labels, such as outputs, features, nodes, classifications, etc. At the highest hierarchical level, an output layer 743 exists. The output layer 743 includes a set of output nodes. Each output node represents a variation of a reference multi-layer in-app asset for a given contextual feature that relates to one or more components of the trained AI model 739. In various embodiments, the results generated by the AI model 739 can be compared to pre-determined and true results, or learned changes and results, as obtained from the user 701 in order to refine and/or modify the parameters used by the deep learning engine 725 to iteratively determine the appropriate predicted or expected responses and/or changes for a given set of inputs. The nodes in the neural network 740 learn the parameters of the trained AI model 739 that can be used to make such decisions when refining the parameters.

In some embodiments, one or more hidden layer(s) 742 exists within the neural network 740 between the input layer 741 and the output layer 743. The hidden layer(s) 742 includes "X" number of hidden layers, where "X" is an integer greater than or equal to one. Each of the hidden layer(s) 742 includes a set of hidden nodes. The input nodes of the input layer 741 are interconnected to the hidden nodes of first hidden layer 742. The hidden nodes of the last ("$X^{th}$") hidden layer 742 are interconnected to the output nodes of the output layer 743, such that the input nodes are not directly interconnected to the output nodes. If multiple hidden layers 742 exist, the input nodes of the input layer 741 are interconnected to the hidden nodes of the lowest (first) hidden layer 742. In turn, the hidden nodes of the first hidden layer 742 are interconnected to the hidden nodes of the next hidden layer 742, and so on, until the hidden nodes of the highest ("$X^{th}$") hidden layer 742 are interconnected to the output nodes of the output layer 743.

An interconnection connects two nodes in the neural network 740. The interconnections in the example neural network 740 are depicted by arrows. Each interconnection has a numerical weight that can be learned, rendering the neural network 740 adaptive to inputs and capable of learning. Generally, the hidden layer(s) 742 allow knowledge about the input nodes of the input layer 741 to be shared among all the tasks corresponding to the output nodes of the output layer 743. In this regard, in some embodiments, a transformation function $f$ is applied to the input nodes of the input layer 741 through the hidden layer(s) 742. In some cases, the transformation function $f$ is non-linear. Also, different non-linear transformation functions $f$ are available including, for instance, a rectifier function $f(x)=\max(0,x)$.

In some embodiments, the neural network 740 also uses a cost function c to find an optimal solution. The cost function c measures the deviation between the prediction that is output by the neural network 740 defined as $f(x)$, for a given input x and the ground truth or target value y (e.g., the expected result). The optimal solution represents a situation where no solution has a cost lower than the cost of the optimal solution. An example of a cost function c is the mean squared error between the prediction and the ground truth, for data where such ground truth labels are available. During the learning process, the neural network 740 can use back-propagation algorithms to employ different optimization methods to learn model parameters (e.g., learn the weights for the interconnections between nodes in the hidden layer(s) 742) that minimize the cost function c. An example of such an optimization method is stochastic gradient descent.

FIG. 8A is a general representation of an image generation AI (IGAI) 802 processing sequence, in accordance with some embodiments. In some embodiments, the IGAI 802 is the first AI model (AI1) 729. As shown, input 806 is configured to receive input in the form of data, e.g., text description having semantic description or key words. The text description can in the form of a sentence, e.g., having at least a noun and a verb. The text description can also be in the form of a fragment or simply one word. The text can also be in the form of multiple sentences, which describe a scene or some action or some characteristic. In some configuration, the input text can also be input in a specific order so as to influence the focus on one word over others or even deemphasize words, letters or statements. Still further, the text input can be in any form, including characters, emojis, ions, foreign language characters (e.g., Japanese, Chinese, Korean, etc.). In some embodiments, text description is enabled by contrastive learning. The basic idea is to embed both an image and text in a latent space so that text corresponding to an images maps to the same area in the latent space as the image. This abstracts out the structure of what it means to be a dog for instance from both the visual and textual representation. In some embodiments, a goal of contrastive representation learning is to learn an embedding space in which similar sample pairs stay close to each other while dissimilar ones are far apart. Contrastive learning can be applied to both supervised and unsupervised settings. When working with unsupervised data, contrastive learning is one of the most powerful approaches in self-supervised learning.

In addition to text, the input can also include other content, e.g., such as images or even images that have descriptive content themselves. Images can be interpreted using image analysis to identify objects, colors, intent, characteristics, shades, textures, three-dimensional representations, depth data, and combinations thereof. Broadly speaking, the input 806 is configured to convey the intent of the user that wishes to utilize the IGAI to generate some digital content. In the context of game technology, the target content to be generated can be a game asset for use in a specific game scene. In such a scenario, the data set used to train the IGAI and input 806 can be used to customized the way AI, e.g., deep neural networks, process the data to steer and tune the desired output image, data or three-dimensional digital asset.

The input 806 is then passed to the IGAI, where an encoder 808 takes input data and/or pixel space data and coverts into latent space data. The concept of "latent space" is at the core of deep learning, since feature data is reduced to simplified data representations for the purpose of finding patterns and using the patterns. The latent space processing 810 is therefore executed on compressed data, which significantly reduces the processing overhead as compared to processing learning algorithms in the pixel space, which is much more heavy and would require significantly more processing power and time to analyze and produce a desired image. The latent space is simply a representation of compressed data in which similar data points are closer together in space. In the latent space, the processing is configured to learn relationships between learned data points that a machine learning system has been able to derive from the information that it gets fed, e.g., the data set used to train the IGAI. In latent space processing 810, a diffusion process is computed using diffusion models. Latent diffusion models rely on autoencoders to learn lower-dimension representations of a pixel space. The latent representation is passed through the diffusion process to add noise at each step, e.g., multiple stages. Then, the output is fed into a denoising network based on a U-Net architecture that has cross-attention layers. A conditioning process is also applied to guide a machine learning model to remove noise and arrive at an image that closely represents what was requested via user input. A decoder 812 then transforms a resulting output from the latent space back to the pixel space. The output 814 may then be processed to improve the resolution. The output 814 is then passed out as the result, which may be an image, graphics, 3D data, or data that can be rendered to a physical form or digital form.

FIG. 8B illustrates additional processing that may be done to the input 806, in accordance with some embodiments. A user interface tool 820 may be used to enable a user to provide an input request 804. The input request 804, as discussed above, may be images, text, structured text, or generally data. In some embodiments, before the input request 804 is provided to the encoder 808, the input can be processed by a machine learning process that generates a machine learning model 832, and learns from a training data set 834. By way of example, the input data maybe be processed to via a context analyzer 826 to understand the context of the request. For example, if the input is "space rockets for flying to the mars", the input can be analyzed 826 to determine that the context is related to outer space and planets. The context analysis may use machine learning model 832 and training data set 834 to find related images for this context or identify specific libraries of art, images or video. If the input request also includes an image of a rocket, the feature extractor 828 can function to automatically identify feature characteristics in the rocket image, e.g., fuel tank, length, color, position, edges, lettering, flames, etc. A feature classifier 830 can also be used to classify the features and improve the machine learning model 832. In some embodiments, the input data 807 can be generated to produce structured information that can be encoded by encoder 808 into the latent space. Additionally, it is possible to extract out structured metadata 822 from the input request. The structured metadata 822 may be, for example, descriptive text used to instruct the IGAI 802 to make a modification to a characteristic or change to the input images or changes to colors, textures, or combinations thereof. For example, the input request 804 could include an image of the rocket, and the text can say "make the rocket wider" or "add more flames" or "make it stronger" or some of other modifier intended by the user (e.g., semantically provided and context analyzed). The structured metadata 822 can then be used in subsequent latent space processing to tune the output to move toward the user's intent. In one embodiment, the structured metadata may be in the form of semantic maps, text, images, or data that is engineered to represent the user's intent as to what changes or modifications should be made an input image or content.

Figure 8C:
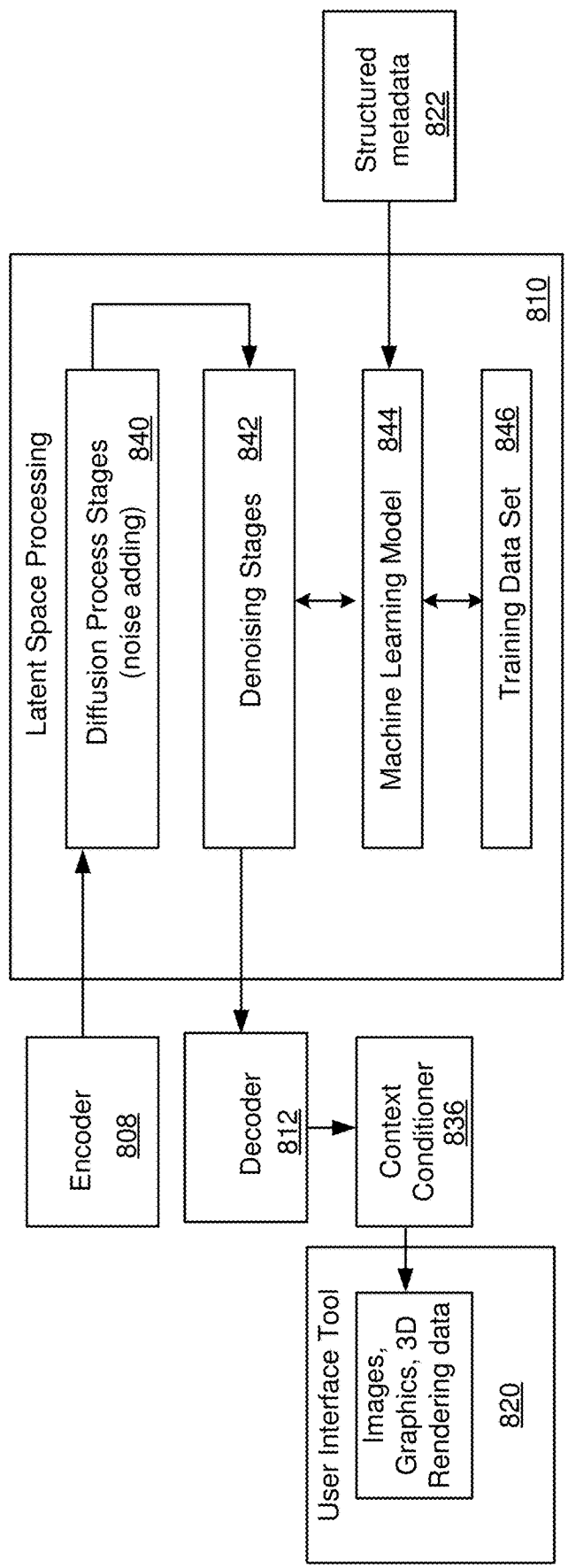
FIG. 8C illustrates how the output of the encoder is then fed into latent space processing, in accordance with some embodiments.

FIG. 8C illustrates how the output of the encoder 808 is then fed into latent space processing 810, in accordance with some embodiments. A diffusion process is executed by diffusion process stages 840, where the input is processed through a number of stages to add noise to the input image or images associated with the input text. This is a progressive process, where at each stage, e.g., 10 to 50 or more stages, noise is added. Next, a denoising process is executed through denoising stages 842. Similar to the noise stages, a reverse process is executed where noise is removed progressively at each stage, and at each stage, machine learning is used to predict what the output image or content should be, in light of the input request intent. In one embodiment, the structured metadata 822 can be used by a machine learning model 844 at each stage of denoising, to predict how the resulting denoised image should look and how it should be modified. During these predictions, the machine learning model 844 uses the training data set 846 and the structured metadata 822, to move closer and closer to an output that most resembles the requested in the input. In some embodiments, during the denoising, a U-Net architecture that has cross-attention layers may be used, to improve the predictions. After the final denoising stage, the output is provided to a decoder 812 that transforms that output to the pixel space. In some embodiments, the output is also upscaled to improve the resolution. The output of the decoder, in some embodiments, can be optionally run through a context conditioner 836. The context conditioner 836 is a process that may use machine learning to examine the resulting output to make adjustments to make the output more realistic or remove unreal or unnatural outputs. For example, if the input asks for "a boy pushing a lawnmower" and the output shows a boy with three legs, then the context conditioner 836 can make adjustments with in-painting processes or overlays to correct or block the inconsistent or undesired outputs. However, as the machine learning model 844 gets smarter with more training over time, there will be less need for a context conditioner 836 before the output is rendered in the user interface tool 820.

Figure 9:
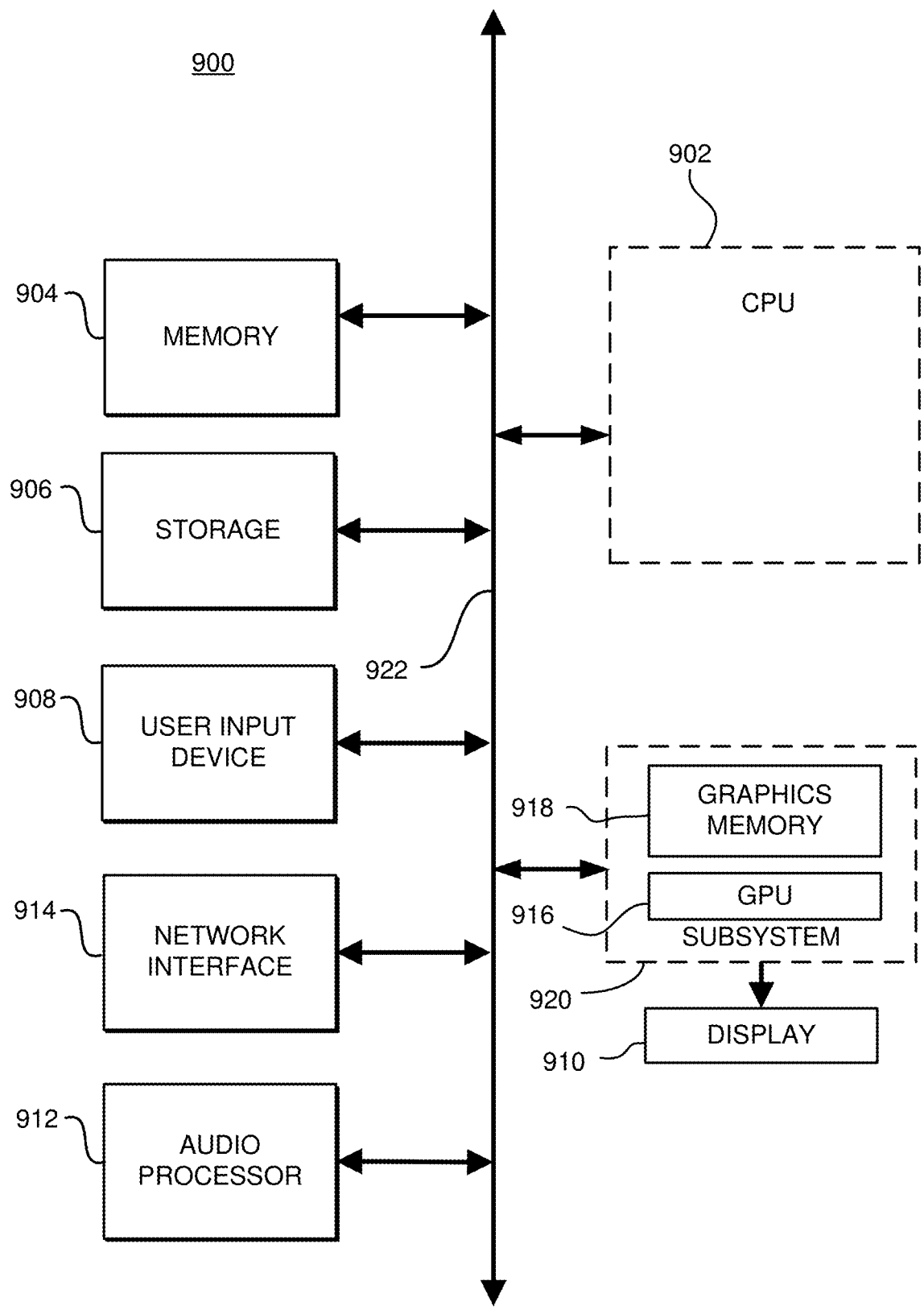
FIG. 9 illustrates components of an example server device within a cloud-based computing system that can be used to perform aspects of the AI-based storyboard generator, in accordance with some embodiments.

FIG. 9 illustrates components of an example server device 900 within a cloud-based computing system that can be used to perform aspects of the AI-based storyboard generator 717, in accordance with some embodiments. This block diagram illustrates the server device 900 that can incorporate or can be a personal computer, video game console, personal digital assistant, a head mounted display (HMD), a wearable computing device, a laptop or desktop computing device, a server or any other digital computing device, suitable for practicing an embodiment of the disclosure. The server device (or simply referred to as "server" or "device") 900 includes a central processing unit (CPU) 902 for running software applications and optionally an operating system. The CPU 902 may be comprised of one or more homogeneous or heterogeneous processing cores. For example, the CPU 902 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 900 may be localized to a player playing a game segment (e.g., game console), or remote from the player (e.g., back-end server processor), or one of many servers using virtualization in the cloud-based gaming system 900 for remote streaming of game play to client devices.

Memory 904 stores applications and data for use by the CPU 902. Storage 906 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 908 communicate user inputs from one or more users to device 900, examples of which may include keyboards, mice, joysticks, touch pads, touch screens, still or video recorders/cameras, tracking devices for recognizing gestures, and/or microphones. Network interface 914 allows device 900 to communicate with other computer systems via an electronic communications network, and may include wired or wireless communication over local area networks and wide area networks such as the internet. An audio processor 912 is adapted to generate analog or digital audio output from instructions and/or data provided by the CPU 902, memory 904, and/or storage 906. The components of device 900, including CPU 902, memory 904, data storage 906, user input devices 908, network interface 914, and audio processor 912 are connected via one or more data buses 922.

A graphics subsystem 920 is further connected with data bus 922 and the components of the device 900. The graphics subsystem 920 includes a graphics processing unit (GPU) 916 and graphics memory 918. Graphics memory 918 includes a display memory (e.g., a frame buffer) used for storing pixel data for each pixel of an output image. Graphics memory 918 can be integrated in the same device as GPU 916, connected as a separate device with GPU 916, and/or implemented within memory 904. Pixel data can be provided to graphics memory 918 directly from the CPU 902. Alternatively, CPU 902 provides the GPU 916 with data and/or instructions defining the desired output images, from which the GPU 916 generates the pixel data of one or more output images. The data and/or instructions defining the desired output images can be stored in memory 904 and/or graphics memory 918. In an embodiment, the GPU 916 includes 3D rendering capabilities for generating pixel data for output images from instructions and data defining the geometry, lighting, shading, texturing, motion, and/or camera parameters for a scene. The GPU 916 can further include one or more programmable execution units capable of executing shader programs.

The graphics subsystem 920 periodically outputs pixel data for an image from graphics memory 918 to be displayed on display device 910. Display device 910 can be any device capable of displaying visual information in response to a signal from the device 900, including CRT, LCD, plasma, and OLED displays. In addition to display device 910, the pixel data can be projected onto a projection surface. Device 900 can provide the display device 910 with an analog or digital signal, for example.

Implementations of the present disclosure for communicating between computing devices may be practiced using various computer device configurations including hand-held devices, microprocessor systems, microprocessor-based or programmable consumer electronics, minicomputers, mainframe computers, head-mounted display, wearable computing devices and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing.

One or more embodiments can also be fabricated as computer readable code (program instructions) on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

What is claimed is:

1. A method for artificial intelligence-based storyboard generation, comprising:
   a) receiving an initial seed input for generation of a storyboard;
   b) setting a current image generation input the same as the initial seed input;
   c) executing a first artificial intelligence model to automatically generate a current frame image based on the current image generation input;
   d) storing the current frame image as a next frame in the storyboard;
   e) storing the current image generation input as a description of the next frame in the storyboard when the current image generation input is in either a textual format or an audio format;
   f) executing a second artificial intelligence model to automatically generate a description of the current frame image;
   g) executing a third artificial intelligence model to automatically generate a next frame input description for the storyboard based on the description of the current frame image;
   h) setting the current image generation input the same as the next frame input description; and
   i) repeating operations (c) through (h) until a final frame image and a description of the final frame image are generated and stored in the storyboard.

2. The method as recited in claim 1, wherein the current frame image includes some content beyond the current image generation input.

3. The method as recited in claim 1, wherein the description of the current frame image is different than the current image generation input.

4. The method as recited in claim 1, wherein the initial seed input is in a textual format.

5. The method as recited in claim 1, wherein the initial seed input is in an image format.

6. The method as recited in claim 1, wherein the initial seed input is in an audio format.

7. The method as recited in claim 1, wherein the initial seed input is one or more of a description of a scene within a video game, a status of a player within the video game, and an action of the player within the video game.

8. The method as recited in claim 7, wherein the initial seed input is received directly from the video game.

9. The method as recited in claim 1, wherein operation (i) is performed to have operations (c) through (h) repeat automatically and sequentially until a stop condition is reached that corresponds to generation and storage of the final frame image and the description of the final frame image.

10. The method as recited in claim 9, wherein the stop condition is one or more of a maximum number frames and a maximum duration for generation of the storyboard.

11. The method as recited in claim 1, further comprising:
    pausing generation of the storyboard after the operation (f);
    receiving a user-supplied steering input for a next frame of the storyboard; and
    resuming generation of the storyboard with performance of the operation (c) such that generation of the current frame image for the storyboard is based on both the description of the current frame image and the user-supplied steering input.

12. The method as recited in claim 11, wherein the user-supplied steering input is in a textual format.

13. The method as recited in claim 11, wherein the user-supplied steering input is in an audio format.

14. The method as recited in claim 11, further comprising:
receiving a user input specifying a user-highlighted portion of a user-selected frame image, wherein the user-supplied steering input is some content identified within the user-highlighted portion of the user-selected frame image.

15. The method as recited in claim 1, further comprising:
applying a weighting factor to a keyword within the description of the current frame image, wherein the third artificial intelligence model is configured to applying emphasis to the keyword within the description of the current frame image in accordance with the weighting factor during generation of the next frame input description for the storyboard.

16. The method as recited in claim 1, further comprising:
providing game state data as input to the third artificial intelligence model, wherein the third artificial intelligence model is configured to generate the next frame input description for the storyboard based on the game state data.

17. The method as recited in claim 1, wherein the operation (c) includes executing the first artificial intelligence model to automatically generate multiple current frame image options based on the current image generation input, the method further comprising:
pausing generation of the storyboard after operation (c);
receiving a user input specifying a selected one of the multiple current frame image options;
setting the current frame image as the selected one of the multiple current frame image options; and
resuming generation of the storyboard with performance of the operation (d).

18. The method as recited in claim 1, further comprising:
stopping generation of the storyboard after a plurality of frames of the storyboard have been generated;
receiving a user input selecting one of the plurality of frames as a regeneration start frame;
setting the current frame image as the regeneration start frame; and
resuming generation of the storyboard with performance of the operation (f).

19. The method as recited in claim 1, further comprising:
receiving one or more user-supplied storyboard constraint inputs; and
providing the one or more user-supplied storyboard constraint inputs as input to each of the first, second, and third artificial intelligence models.

20. A system for artificial intelligence-based storyboard generation, comprising:
an input processor configured to receive an initial seed input for generation of a storyboard;
a first artificial intelligence model configured to automatically generate an image for the storyboard based on an input specification;
a second artificial intelligence model configured to automatically generate a description of the image generated by the first artificial intelligence model;
a third artificial intelligence model configured to automatically generate a next frame input description for the storyboard based on the description of the image generated by the second artificial intelligence model;
a controller configured to initiate generation of the storyboard by providing the initial seed input as the input specification to the first artificial intelligence model for generation of a first frame of the storyboard, the controller configured to direct successive execution of the first, second, and third artificial intelligence models for respective generation of successive frames of the storyboard with the next frame input description for the storyboard as generated by the third artificial intelligence model provided as the input specification to the first artificial intelligence model; and
an output processor configured to store each image generated by the first artificial intelligence model and its corresponding input specification as a respective frame of the storyboard.

* * * * *